US012581347B2

(12) United States Patent
Kanneath Abraham et al.

(10) Patent No.: US 12,581,347 B2
(45) Date of Patent: Mar. 17, 2026

(54) METHOD AND APPARATUS FOR MANAGING GAP CONFIGURATION OF MULTIPLE MEASUREMENT GAPS IN A WIRELESS COMMUNICATION SYSTEM

(71) Applicant: Samsung Electronics Co., Ltd., Suwon-si (KR)

(72) Inventors: Aby Kanneath Abraham, Bangalore (IN); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 18/297,550

(22) Filed: Apr. 7, 2023

(65) Prior Publication Data

US 2023/0328572 A1 Oct. 12, 2023

(30) Foreign Application Priority Data

Apr. 7, 2022 (IN) .............................. 202241021018
Mar. 11, 2023 (IN) .............................. 202241021018

(51) Int. Cl.
*H04W 24/10* (2009.01)

(52) U.S. Cl.
CPC .................................. *H04W 24/10* (2013.01)

(58) Field of Classification Search
CPC ..... H04W 24/10; H04W 24/08; H04W 72/23; H04W 72/231; H04W 72/232; H04L 5/0048
See application file for complete search history.

(56) References Cited

U.S. PATENT DOCUMENTS

2022/0046454 A1 2/2022 Yiu et al.
2022/0104059 A1 3/2022 Hu et al.
2023/0413095 A1* 12/2023 Hu ........................ H04W 76/15

FOREIGN PATENT DOCUMENTS

EP 3837877 A1 6/2021
WO 2020034193 A1 2/2020
WO 2021206929 A1 10/2021

OTHER PUBLICATIONS

International Search Report and Written Opinion of the International Searching Authority dated Jul. 7, 2023, in connection with International Application No. PCT/KR2023/004757, 6 pages.

(Continued)

*Primary Examiner* — Ji-Hae Yea

(57) ABSTRACT

The disclosure relates to a 5G or 6G communication system for supporting a higher data transmission rate. The present subject matter refers to a method for managing gap configuration of multiple measurement gaps. According to one embodiment of the present disclosure, a method performed by a base station in a wireless communication system is provided. The method includes: transmitting, to a user equipment (UE), a measurement gap configuration information including a first measurement gap configuration without a measurement gap identifier (ID) and a measurement gap list including at least one second measurement gap configuration with a gap ID; transmitting, to the UE, a measurement object information including without an associated measurement gap ID; and configuring a measurement gap based on the first measurement gap configuration for a frequency associated with the measurement object information.

20 Claims, 12 Drawing Sheets

<u>800</u>

┌─ 802
Configuring a first measurement gap without using a gap identifier in a first frequency configuration ┌─ 804
Determining that a second measurement gap is required based on an addition of one or more second frequency layers ┌─ 806
Adding the second measurement gap to a measurement gap list of a UE upon determining that the second measurement gap is required ┌─ 808
Configuring the second measurement gap by using the gap identifier in the second frequency configuration upon adding the second measurement gap to the measurement gap list ┌─ 810
Transmitting the first frequency configuration and the second frequency configuration to the UE for performing the one or more frequency measurements

(56) References Cited

OTHER PUBLICATIONS

Mediatek Inc., "Introduction of RRC signaling for measurement gap enhancement," R2-2204179, 3GPP TSG-RAN WG2 Meeting #117, Feb. 21-Mar. 3, 2022, 80 pages.
Nokia et al., "Discussion on support of Concurrent Measurement Gap," R2-2201012, 3GPP TSG-RAN WG2 Meeting #116bis Electronic, Jan. 17-25, 2022, 5 pages.
CATT, "Discussion on Concurrent MG," R2-2200500, 3GPP TSG-RAN WG2 Meeting #116bis-e, Jan. 17-25, 2022, 7 pages.
Examination report dated Feb. 13, 2024, in connection with Indian Application No. 202241021018, 8 pages.
Supplementary European Search Report dated Jun. 26, 2025, in connection with European Patent Application No. EP23785050.8, 11 pages.
Samsung, "Resolving FFS on Conditional Presence of Gapld," R2-2205377, 3GPP TSG-RAN WG2 Meeting #118 Electronic, May 2022, 4 pages.
MediaTek Inc., "Report of [AT116-e][041][MGE] Concurrent MG (MediaTek)," R2-2111471 3GPP TSG-RAN WG2 #116e, eMeeting, Nov. 2021, 16 pages.
Samsung, "[S651] Including one gap without measGapld in concurrent gaps," R2-2205376, 3GPP TSG-RAN WG2 Meeting #118 Electronic, May 2022, 6 pages.
Mediatek, "[Pre116bis][012][MGE] Summary of 8.22.3 Multiple concurrent and independent MG patterns (MediaTek)," R2-2201672, 3GPP TSG-RAN WG2 #116bis-e, eMeeting, Jan. 2022, 7 pages.
Vivo, "Discussion on multiple concurrent and independent MG patterns," R2-2109754, 3GPP TSG-RAN WG2 Meeting #116-e, Electronic, Nov. 2021, 12 pages.

* cited by examiner

400

500

600

800

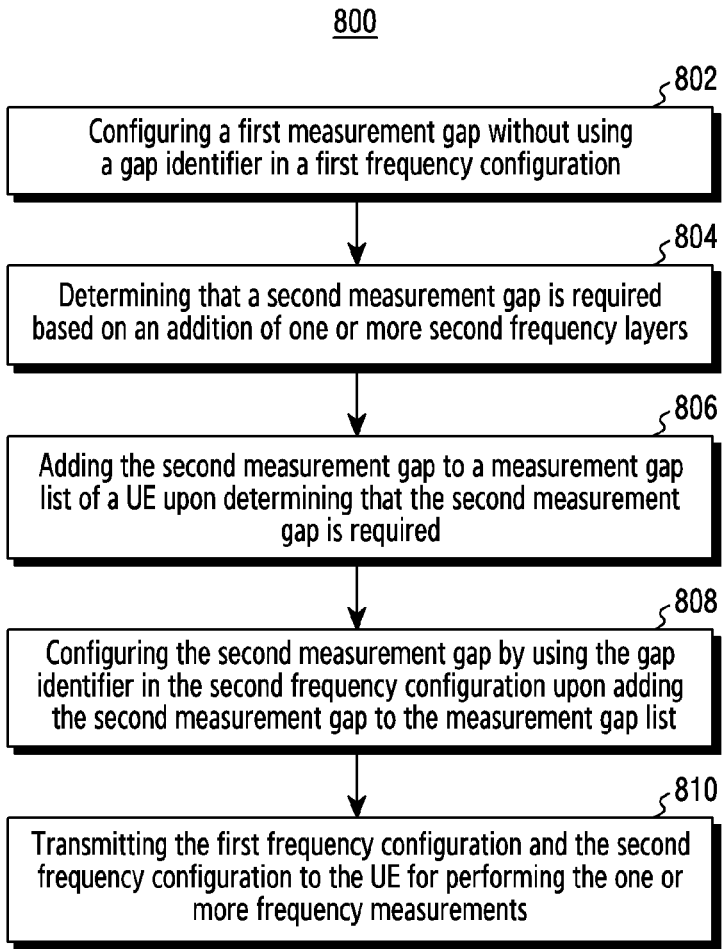

802

Configuring a first measurement gap without using a gap identifier in a first frequency configuration

804

Determining that a second measurement gap is required based on an addition of one or more second frequency layers

806

Adding the second measurement gap to a measurement gap list of a UE upon determining that the second measurement gap is required

808

Configuring the second measurement gap by using the gap identifier in the second frequency configuration upon adding the second measurement gap to the measurement gap list

810

Transmitting the first frequency configuration and the second frequency configuration to the UE for performing the one or more frequency measurements

902

Receiving a first frequency configuration associated with one or more first frequency layers and a second frequency configuration associated with one or more second frequency layers from a gNB

904

Receiving a first measurement gap configuration associated with a first measurement gap and a second measurement gap configuration associated with a second measurement gap from the gNB

906

Determining that at least one of the one or more first frequency layers and the one or more second frequency layers are required to perform one or more frequency measurements

908

Determining if a gap identifier is associated with one of the one or more first frequency layers and the one or more second frequency layers from the first frequency configuration, the second frequency configuration ,the first measurement gap configuration, and the second measurement gap configuration

910

Associating the first measurement gap with the one or more first frequency layers and the second measurement gap with the one or more second frequency layers based a result of the determination

912

Performing the one or more frequency measurements of the one or more first frequency layers and the one or more second frequency layers by applying at least one of the first measurement gap and the second measurement gap based on a result of the association

FIG.9

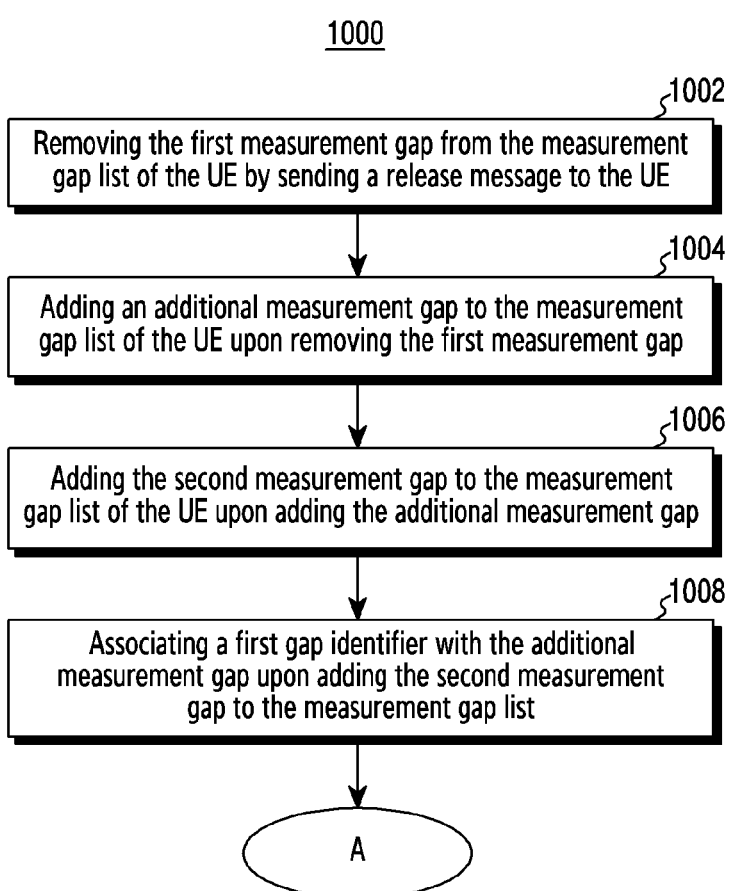

1000

1002
Removing the first measurement gap from the measurement gap list of the UE by sending a release message to the UE 1004
Adding an additional measurement gap to the measurement gap list of the UE upon removing the first measurement gap 1006
Adding the second measurement gap to the measurement gap list of the UE upon adding the additional measurement gap 1008
Associating a first gap identifier with the additional measurement gap upon adding the second measurement gap to the measurement gap list

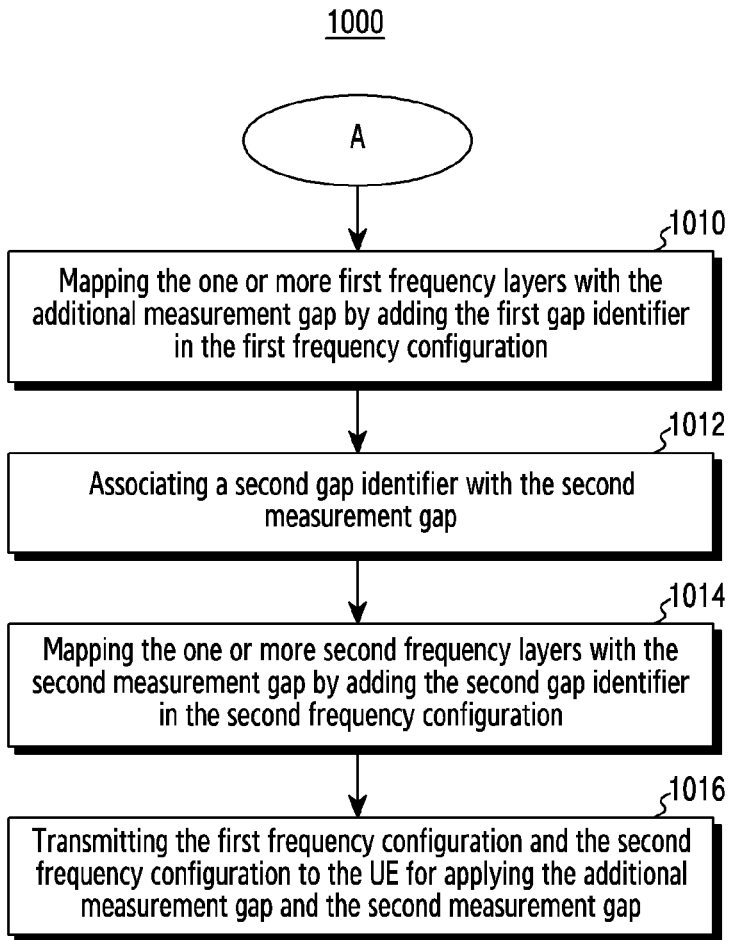

1000

A

1010

Mapping the one or more first frequency layers with the additional measurement gap by adding the first gap identifier in the first frequency configuration

1012

Associating a second gap identifier with the second measurement gap

1014

Mapping the one or more second frequency layers with the second measurement gap by adding the second gap identifier in the second frequency configuration

1016

Transmitting the first frequency configuration and the second frequency configuration to the UE for applying the additional measurement gap and the second measurement gap

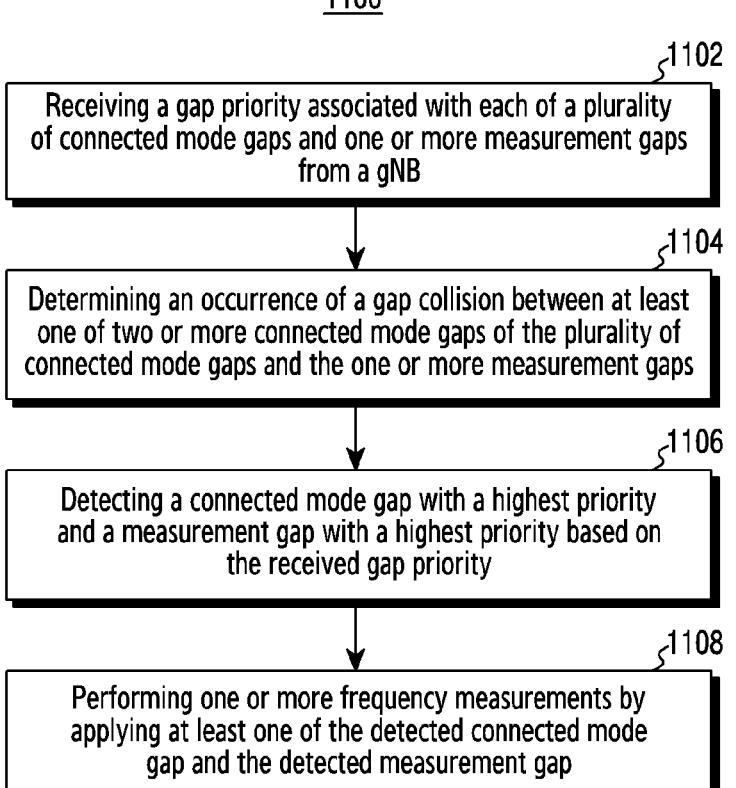

1102
Receiving a gap priority associated with each of a plurality of connected mode gaps and one or more measurement gaps from a gNB 1104
Determining an occurrence of a gap collision between at least one of two or more connected mode gaps of the plurality of connected mode gaps and the one or more measurement gaps 1106
Detecting a connected mode gap with a highest priority and a measurement gap with a highest priority based on the received gap priority 1108
Performing one or more frequency measurements by applying at least one of the detected connected mode gap and the detected measurement gap

FIG.11

METHOD AND APPARATUS FOR MANAGING GAP CONFIGURATION OF MULTIPLE MEASUREMENT GAPS IN A WIRELESS COMMUNICATION SYSTEM

CROSS-REFERENCE TO RELATED APPLICATIONS

This application is based on and claims priority under 35 U.S.C. § 119 to Indian Patent Application No. 202241021018, filed Apr. 7, 2022, and Indian Patent Application No. 202241021018, filed Mar. 11, 2023, in the Indian Intellectual Property Office, the disclosure of which is incorporated by reference herein in its entirety.

BACKGROUND

1. Field

The present disclosure generally relates to wireless communication. In particular, the present disclosure relates to a system and a method for managing gap configuration of multiple measurement gaps and connected mode gaps.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/ service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure.

According to one embodiment of the present disclosure, a method performed by a base station in a wireless communication system is provided. The method includes: transmitting, to a user equipment (UE), a measurement gap configuration information including a first measurement gap configuration without a measurement gap identifier (ID) and a measurement gap list including at least one second measurement gap configuration with a gap ID; transmitting, to the UE, a measurement object information including without an associated measurement gap ID; and configuring a measurement gap based on the first measurement gap configuration for a frequency associated with the measurement object information.

According to one embodiment of the present disclosure, a method performed by a user equipment (UE) in a wireless communication system is provided. The method includes: receiving, from a base station, a measurement gap configuration information including a first measurement gap configuration without a measurement gap identifier (ID) and a measurement gap list including at least one second measurement gap configuration with a gap ID; receiving, from the base station, a measurement object information including without an associated measurement gap ID; and performing measurement with a measurement gap based on the first measurement gap configuration for a frequency associated with the measurement object information.

According to one embodiment of the present disclosure, a base station in a wireless communication system is provided. The base station includes: a transceiver; and a controller configured to: transmit, to a user equipment (UE), a measurement gap configuration information including a first measurement gap configuration without a measurement gap identifier (ID) and a measurement gap list including at least one second measurement gap configuration with a gap ID; transmit, to the UE, a measurement object information including without an associated measurement gap ID; and configure a measurement gap based on the first measurement gap configuration for a frequency associated with the measurement object information.

According to one embodiment of the present disclosure, a method for managing gap configuration of multiple measurement gaps is disclosed. The method includes receiving, by a user equipment (UE), a first frequency configuration associated with one or more first frequency layers and a second frequency configuration associated with one or more second frequency layers from a gNodeB (gNB). The method also includes receiving a first measurement gap configuration associated with a first measurement gap and a second measurement gap configuration associated with a second measurement gap from the gNB. Further, the method includes determining, by the UE, that at least one of the one or more first frequency layers and the one or more second frequency layers are required to perform one or more frequency measurements upon receiving the first frequency configuration and the second frequency configuration.

In an embodiment of the present disclosure, the one or more frequency measurements comprise at least one of inter-frequency, inter-radio access technology (RAT) measurements, and intra-frequency measurements outside an active downlink Bandwidth Part (BWP) and positioning reference signal measurements. Further, the method includes determining, by the UE, if a gap identifier is associated with one of the one or more first frequency layers and the one or more second frequency layers from the received first frequency configuration, the received second frequency configuration, the first measurement gap configuration, and the second measurement gap configuration upon determining that the at least one of the one or more first frequency layers and the one or more second frequency layers are required to perform the one or more frequency measurements.

Furthermore, the method includes associating, by the UE, the first measurement gap with the one or more first frequency layers and the second measurement gap with the one or more second frequency layers based on a result of the determination. The method also includes performing, by the UE, the one or more frequency measurements of the one or more first frequency layers and the one or more second frequency layers by applying at least one of the first measurement gap and the second measurement gap based upon completing the association.

According to another embodiment of the present disclosure, a method for generating frequency configurations for multiple measurement gaps is disclosed. The method includes configuring, by a gNB, a first measurement gap without using a gap identifier in a first frequency configuration associated with one or more first frequency layers. Further, the method includes determining, by a gNB, that a second measurement gap is required based on an addition of one or more second frequency layers. Further, the method includes adding, by a gNB, the second measurement gap to a measurement gap list of a UE upon determining that the second measurement gap is required. Furthermore, the method includes configuring, by a gNB, the second measurement gap by using the gap identifier in a second frequency configuration upon adding the second measurement gap to the measurement gap list. The method also includes transmitting, by a gNB, the first frequency configuration and the second frequency configuration to the UE for performing the one or more frequency measurements.

According to another embodiment of the present disclosure, a method for managing gap configuration of multiple gaps is disclosed. The method includes receiving, by a UE, a gap priority associated with each of a plurality of connected mode gaps and one or more measurement gaps from a gNB. Further, the method includes determining, by the UE, an occurrence of a gap collision between at least one of two or more connected mode gaps of the plurality of connected mode gaps and the one or more measurement gaps upon receiving the gap priority. Furthermore, the method includes detecting, by the UE, at least one of a connected mode gap among the two or more connected mode gaps with a highest priority and a measurement gap among the one or more measurement gaps with a highest priority based on the received gap priority for each of the set of plurality of connected mode gaps and the one or more measurement gaps upon determining the occurrence of the gap collision. The method also includes performing, by the UE, one or more frequency measurements by applying at least one of the detected connected mode and the detected measurement gap.

According to another embodiment of the present disclosure, a UE for managing gap configuration of multiple measurement gaps is disclosed. The UE comprises a memory and one or more processors communicatively coupled to the memory. Further, the one or more processors are configured to receive a first frequency configuration associated with one or more first frequency layers and a second frequency configuration associated with one or more second frequency layers from a gNB. The one or more processors receive a first measurement gap configuration associated with a first measurement gap and a second measurement gap configuration associated with a second measurement gap from the gNB. Furthermore, the one or more processors are configured to determine that at least one of the one or more first frequency layers and the one or more second frequency layers are required to perform one or more frequency measurements upon receiving the first frequency configuration and the second frequency configuration.

The one or more frequency measurements comprise at least one of inter-frequency, inter-RAT measurements, and intra-frequency measurements outside an active downlink BWP and positioning reference signal measurements. The one or more processors are configured to determine if a gap identifier is associated with one of the one or more first frequency layers and the one or more second frequency layers from the received first frequency configuration, the received second frequency configuration, the first measurement gap configuration, and the second measurement gap configuration upon determining that the at least one of the one or more first frequency layers and the one or more second frequency layers are required to perform the one or more frequency measurements. Additionally, the one or more processors are configured to associate the first measurement gap with the one or more first frequency layers and the second measurement gap with the one or more second frequency layers based on a result of the determination. The one or more processors are configured to perform the one or more frequency measurements of the one or more first frequency layers and the one or more second frequency layers by applying at least one of the first measurement gap and the second measurement gap based upon completing the association.

According to another embodiment of the present disclosure, a gNB for generating frequency configuration of multiple measurement gaps is disclosed. The gNB comprises a memory and one or more processors communicatively coupled to the memory. Further, the one or more processors are configured to configure a first measurement gap without using a gap identifier in a first frequency configuration associated with one or more first frequency layers. Furthermore, the one or more processors are configured to determine that a second measurement gap is required based on an addition of one or more second frequency layers. Further, the one or more processors are configured to add the second measurement gap to a measurement gap list of a UE upon determining that the second measurement gap is required. Additionally, the one or more processors are configured to configure the second measurement gap by using the gap identifier in a second frequency configuration upon adding the second measurement gap to the measurement gap list. The one or more processors are configured to transmit the first frequency configuration and the second frequency configuration to the UE for performing the one or more frequency measurements.

According to another embodiment of the present disclosure, a UE for managing gap configuration of multiple gaps is disclosed. The UE comprises a memory and one or more processors communicatively coupled to the memory. Further, the one or more processors are configured to receive a gap priority associated with each of a plurality of connected mode gaps and one or more measurement gaps from a gNB. Furthermore, the one or more processors are configured determine an occurrence of a gap collision between at least one of two or more connected mode gaps of the plurality of connected mode gaps and the one or more measurement gaps upon receiving the gap priority. Additionally, the one or more processors are configured to detect at least one of a connected mode gap among the two or more connected mode gaps with a highest priority and a measurement gap among the one or more measurement gaps with a highest priority based on the received gap priority for each of the set of plurality of connected mode gaps and the one or more measurement gaps upon determining the occurrence of the gap collision. The one or more processors are configured to perform one or more frequency measurements by applying at least one of the detected connected mode and the detected measurement gap.

To further clarify the advantages and features of the present disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 illustrates a flow diagram depicting a method for generating frequency configurations for multiple measurement gaps according to an embodiment of the present disclosure;

FIG. 9 illustrates a flow diagram depicting a method for managing gap configuration of multiple measurement gaps according to an embodiment of the present disclosure;

FIGS. 10A and 10B illustrates a flow diagram depicting a method for generating frequency configurations for multiple measurement gaps according to another embodiment of the present disclosure; and FIG. 11 illustrates a flow diagram depicting a method for managing gap configuration of multiple gaps according to another embodiment of the present disclosure.

Figure 1:
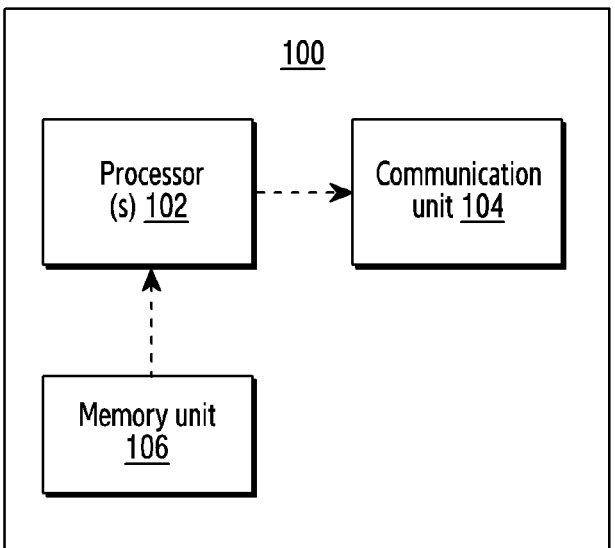
FIG. 1 illustrates a gNB for generating frequency configurations for multiple measurement gaps according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the present disclosure will be described below in detail with reference to the accompanying drawings.

Generally, in wireless technologies, such as new radio (NR) and long-term evolution (LTE), a radio resource control (RRC) connected user equipment (UE) performs multiple measurements for radio resource management (RRM) purpose, positioning, and the like. For RRM, the UE measures reference signals, such as synchronization signal block (SSB), channel state information reference signal (CSI-RS) and the like, and reports to the network. Further, according to NR specification TS 38.300, the multiple measurements to be performed by the UE for connected mode mobility are classified in at least four measurement types i.e., intra-frequency NR measurements, inter-frequency NR measurements, inter-radio access terminal (RAT) measurements for evolved universal terrestrial radio Access (E-UTRA), and inter-RAT measurements for UTRA. For each of the multiple measurement types, one or more measurement objects are required to be defined. For example, a measurement object may be defined as carrier frequency to be monitored.

Further, for each of the one or more measurement objects, one or more reporting configurations may be defined. For example, a reporting configuration may be defined as reporting criteria. Three reporting criteria are used for event triggered reporting, periodic reporting and event triggered periodic reporting. The association between the measurement object and the reporting configuration is created by a measurement identity. The measurement identity links together one measurement object and one reporting configuration of same RAT. Furthermore, the measurement identity is used while reporting results of the measurements. The UE may also report SSB/CSI-RS measurements and additional reference signals-based measurements, such as downlink positioning reference signal (PRS), for positioning.

Furthermore, when the UE is required to measure inter frequency NR, inter-RAT measurements, or intra frequency measurements outside the active downlink bandwidth part (BWP) in case the SSB is not completely contained in the active downlink bandwidth part (DL BWP), the UE may use measurement gaps. The measurement gaps are configured by the network (for e.g., gNB in NR), such that there may not be any transmission or reception during a gap period associated with the measurement gaps. The UE requires the measurement gaps to perform measurements as the UE cannot measure the target carrier frequency while simultaneously transmitting/receiving on a serving cell. Furthermore, measurement gap configuration associated with the measurement gaps includes a gap offset, gap length, repetition period and measurement gap timing advance. The gap offset specifies the sub-frame where the measurement gaps occur. The gap length gives the duration of the measurement gaps while the repetition period defines how often the measurement gaps can occur.

3rd generation partnership project (3GPP) has defined a set of measurement gap patterns. Each set of measurement gap pattern corresponds to a gap length and a gap repetition period. For example, in NR release 16, there are 26 gap patterns defined. Further, measurement gap timing advance (MGTA) specifies a timing advance value in milliseconds (ms). The measurement gap occurs MGTA milliseconds before the subframe given by the measurement gap offset. Furthermore, till release 16 of NR specifications, the UE may be configured with maximum one measurement gap at any time. The measurement gaps are activated immediately after the configuration from the gap offset that comes after the reconfiguration. This leads to restrictions for the UE and network implementation.

According to TS 38.133 on measurement gaps, if the UE requires the measurement gaps to identify and measure intra-frequency cells, inter-frequency cells, inter-RAT E-Universal terrestrial radio access network (UTRAN) cells, or any combination thereof and the UE does not support independent measurement gap patterns for different frequency ranges, the network may provide a single per-UE measurement gap pattern for concurrent monitoring of all frequency layers in order for the requirements in the following clauses to apply. If the UE requires measurement gaps to identify and measure intra-frequency cells and/or inter-frequency cells and/or inter-RAT E-UTRAN cells and the UE supports independent measurement gap patterns for different frequency ranges, in order for the requirements in the following clauses to apply, the network may provide either per-FR measurement gap patterns for frequency range where UE requires per-FR measurement gap for concurrent monitoring of all frequency layers of each frequency range independently, or a single per-UE measurement gap pattern for concurrent monitoring of all frequency layers of all frequency ranges.

If the UE is configured via LPP to measure positioning reference signals (PRS) for any reference signal time delay (RSTD), positioning reference signal reference signal received power (PRS-RSRP), and user equipment reception-transmission (UE Rx-Tx) time difference measurement defined in TS 38.215 for the requirements to apply, the network may provide a single per-UE measurement gap pattern for concurrent monitoring of all positioning frequency layers and intra frequency, inter-frequency, inter-RAT frequency layers of all frequency ranges, or any combination thereof. For measurement gap patterns other than #24 and #25, if the UE supports independent measurement gap patterns for different frequency ranges, the network may provide a per-frequency range (FR) measurement gap pattern for the frequency range for concurrent monitoring of all positioning frequency layers and intra-frequency, inter-frequency cells, inter-RAT frequency layers in the corresponding frequency range, or any combination thereof.

Further, during the per-UE measurement gaps, the UE is not required to conduct reception/transmission from/to the corresponding E-UTRAN PCell, E-UTRAN SCell(s) and NR serving cells for E-UTRA-NR dual connectivity except for the reception of signals used for RRM measurement(s) and the signals used for random access procedure according to TS 38.321. Also, the UE is not required to conduct reception/transmission from/to the corresponding NR serving cells for SA (with single carrier or CA configured) except the reception of signals used for RRM measurement(s), PRS measurement(s) and the signals used for random access procedure. The UE is also not required to conduct reception/transmission from/to the corresponding PCell, SCell(s) and E-UTRAN serving cells for NR-E-UTRA dual connectivity except the reception of signals used for RRM measurement(s), PRS measurement(s) and the signals used for random access procedure. Furthermore, the UE is not required to conduct reception/transmission from/to the corresponding NR serving cells for NR-DC except the reception of signals used for RRM measurement(s), PRS measurement(s) and the signals used for random access procedure.

During the per-FR measurement gaps, the UE is not required to conduct reception/transmission from/to the corresponding E-UTRAN PCell, E-UTRAN SCell(s) and NR serving cells in the corresponding frequency range for E-UTRA-NR dual connectivity except the reception of signals used for RRM measurement(s) and the signals used for random access procedure according to TS38.321. Further, the UE is not required to conduct reception/transmission from/to the corresponding NR serving cells in the corresponding frequency range for SA (with single carrier or CA configured) except the reception of signals used for RRM measurement(s), PRS measurement(s) and the signals used for random access procedure according to TS38.321. The UE is also not required to conduct reception/transmission from/to the corresponding PCell, SCell(s) and E-UTRAN serving cells in the corresponding frequency range for NR-E-UTRA dual connectivity except the reception of signals used for RRM measurement(s), PRS measurement(s) and the signals used for random access procedure according to TS38.321. Furthermore, the UE is not required to conduct reception/transmission from/to the corresponding NR serving cells in the corresponding frequency range for NR-DC except the reception of signals used for RRM measurement(s), PRS measurement(s) and the signals used for random access procedure according to TS38.321.

Till Release 16 NR specification, a UE may be configured with a per UE gap. The UE may be configured with one per FR1 gap or per FR2 gap if the UE has a per FR capability. In NR Release 17, the network may configure the UE with multiple measurement gaps. Each of the multiple measurement gaps may be associated with one or more frequency layers, while each of the one or more frequency layers can be associated with only one concurrent gap. Further, each measured synchronization signal block (SSB) or long term evolution (LTE) frequency is considered as one frequency layer. The SSB and channel state information reference signal (CSI-RS) measurement in one measurement object (MO) are considered as different frequency layers. Furthermore, one of the measurement gaps can also be associated with positioning reference signal (PRS), i.e., the PRS may also be considered as a frequency layer. In other words, each E-UTRA MO, or PRS is a frequency layer while NR MO may include one or more frequency layers depending on whether the NR MO includes either SSB, CSI-RS or both.

Based on current decisions in 3GPP, when the UE is configured with the per-UE gap or one per-FR1 gap, one per-FR2 gap (except for preconfigured gaps) or any combination thereof, the gNB may provide an identifier for the gap. But when there are more than one gap per-UE, more than one per-FR gap, a per-UE, or a per-FR gap configured, the gNB may provide a gap identifier for all the gaps. The gNB links measurement gaps to measurement objects and frequency layers by including the associated gap identifiers in the configuration of the measurement objects. The gap identifier is mapped to the SSB/CSI-RS within a measurement object configuration. Whenever a measurement object configuration is modified, the UE is required to restart the measurements.

According to an extract of current 3GPP CR, the gap identifier is mandatory when more than one per UE gap is configured, more than one FR1 gap is configured, more than one FR2 gap is configured, or per UE gap is configured together with per FR gap. However, such a restriction reduces the flexibility of the network and the UE implementations. Further, the gap identifier is optionally present when the one or more measurement gaps are configured as preconfigured measurement gaps. Otherwise, the measurement gap is not present and when absent, the field is required to be released by the UE. It is FFS whether and how to specify the conditional presence for gap ID. Further with such restriction, if the UE is configured with more than one per UE gap, more than one FR1 gap, more than one FR2 gap, or per UE gap together with per FR gap, and at least one of the configured gaps are configured without a gap identifier, the UE does not apply such a configuration and sends a failure message. For example, the failure message may be RRC Reconfiguration failure or RRC Resume failure to the gNB. Furthermore, such a configuration also prevents the UE from measuring one or more frequency layers as the measurement gaps may not be available for such measurements.

Further, till Release 16 of 3GPP specifications, the measurement gaps may be used for measurements, such as intra frequency, inter frequency, inter RAT, positioning, and the like. In release 17 of 3GPP specification, a set of measurement gaps are introduced, such as multi SIM (MUSIM) gaps, non-terrestrial network (NTN) gaps, enhanced positioning (ePOS) gaps, frequency range 2 uplink (FR2UL) gaps, and the like. Furthermore, MUSIM UEs support multiple USIMs within the same device. A RRC connected MUSIM/USIM can request its network to allocate the measurement gaps during its connected mode operations for performing idle/inactive mode operations in other USIMs. In Release 17 of 3GPP specification, a UE can request up to 2 periodic MUSIM gaps and one aperiodic MUSIM gap.

In release 17, 3GPP introduced enhancements for measurement gaps for non-terrestrial network operations. These gaps are mainly used for monitoring configured SSB-based RRM Measurement timing configuration (SMTC) in NTN. Further, the 3GPP has introduced support for the ePOS gaps in Release 17. The ePOS gaps are used exclusively for positioning measurement, and can be preconfigured, activated, or deactivated based on layer 2 medium access control (MAC) signaling. Furthermore, the 3GPP also introduced uplink only gaps in frequency range2 (FR2) in release 17. Upon configuration, the FR2UL gaps are mainly used for body proximity sensing (BPS) measurements. The FR2UL gaps are applicable only for FR2 and may be only used in uplink slots, i.e., downlink and special slots of time division duplexing are available for transmission or reception.

In the current release of 3GPP, each of concurrent measurement gaps can be associated with a gap sharing configuration. Conventionally, the concurrent measurement gaps may not be configured leading to failure in performing frequency measurements, such as inter-frequency, inter-RAT measurements, and intra-frequency measurements outside the BWP. The gap sharing configuration specifies how the UE shares the measurement gap among different type of measurements. The gNB configures the UE with a measurement gap sharing scheme which informs the UE how the UE may divide the provided measurement gap across intra frequency and inter-frequency/inter-RAT measurements.

In release 17 version of 3GPP specification, there is no gap sharing that can be configured between different measurement gaps or between measurement gaps and gaps for other types, such as MUSIM, NTN, ePOS or for FR2-UL gaps. Further, each of the measurement gap can be configured with a gap priority to resolve collisions between measurement gap occasions through RRC signaling. In each collision, the UE may perform only measurements associated with the measurement gap with the highest priority and may drop the measurements associated with lower priority. In the release 17 version of 3GPP specifications, only the measurement gaps are associated with priority (i.e., there is no gap priority for MUSIM gaps, NTN gaps, ePOS gaps, FR2-UL gaps), and there is no equal priority between gaps.

An example measurement gap configuration for supporting multiple measurement gaps with gap sharing and gap priority from release 17 is given in Table 1. Further, information element (IE) MeasGapConfig in the Table 1 specifies a measurement gap configuration and controls setup/release of measurement gaps.

TABLE 1

```
-- ASN1START
-- TAG-MEASGAPCONFIG-START
MeasGapConfig ::=          SEQUENCE {
    gapFR2              SetupRelease { GapConfig }        OPTIONAL, -- Need M
    ...,
    [[
```

TABLE 1-continued

```
gapFR1               SetupRelease { GapConfig }        OPTIONAL, -- Need M
gapUE                SetupRelease { GapConfig }        OPTIONAL -- Need M
]],
[[
gapUEToAddModList-r17                    SEQUENCE (SIZE (1..maxNrofGapId-1-r17) OF GapConfig
     OPTIONAL, -- Need N
gapUEToReleaseList-r17                   SEQUENCE (SIZE (1..maxNrofGapId-1-r17)) OF MeasGapId-r17
     OPTIONAL, -- Need N
gapFR1ToAddModList-r17                   SEQUENCE (SIZE (1..maxNrofGapId-1-r17)) OF GapConfig
     OPTIONAL, -- Need N
gapFR1ToReleaseList-r17 SEQUENCE (SIZE (1..maxNrofGapId-1-r17)) OF MeasGapId-r17
OPTIONAL, -- Need N
gapFR2ToAddModList-r17                   SEQUENCE (SIZE (1..maxNrofGapId-1-r17)) OF GapConfig
     OPTIONAL, -- Need N
gapFR2ToReleaseList-r17                  SEQUENCE (SIZE (1..maxNrofGapId-1-r17)) OF MeasGapId-r17
     OPTIONAL -- Need N
]]
}
GapConfig ::=       SEQUENCE {
  gapOffset      INTEGER (0..159),
  mgl      ENUMERATED {ms1dot5, ms3, ms3dot5, ms4, ms5dot5, ms6},
  mgrp       ENUMERATED {ms20, ms40, ms80, ms160},
  mgta       ENUMERATED {ms0, ms0dot25, ms0dot5},
  ...,
  [[
  refServCellIndicator   ENUMERATED {pCell, pSCell, mcg-FR2}        OPTIONAL -- Cond NEDCorNRDC
  ]],
  [[
  refFR2ServCellAsyncCA-r16   ServCellIndex        OPTIONAL, -- Cond AsyncCA
  mgl-r16       ENUMERATED {ms10, ms20}        OPTIONAL -- Cond PRS
  ]],
  [[
  measGapId-r17      MeasGapId-r17        OPTIONAL, -- Cond GapID
  preConfigInd-r17      ENUMERATED {true}        OPTIONAL, -- Need R
  nscgInd-r17      ENUMERATED {true}        OPTIONAL, -- Need R
  mgta-r17       ENUMERATED {ms0dot75}        OPTIONAL, -- Need R
  mgl-r17      ENUMERATED {ms1, ms2, ms5}        OPTIONAL, -- Need R
  gapAssociationPRS-r17   ENUMERATED {true}        OPTIONAL, -- Need R
  gapSharing-r17     MeasGapSharingScheme        OPTIONAL, -- Need R
  gapPriority-r17     GapPriority-r17        OPTIONAL -- Need R
  ]]
}
-- TAG-MEASGAPCONFIG-STOP
-- ASN1STOP
```

In Table 1, gapAssociationPRS indicates that PRS measurement is associated with the measurement gap. The network only includes the gapAssociation PRS field for one per UE gap. Further, the gapFR1 corresponds to a measurement gap configuration that applies to FR1 only. In (NG) EN-DC, the gapFR1 cannot be set up by NR RRC (i.e., only LTE RRC can configure FR1 measurement gap). In NE-DC, the gapFR1 can only be set up by NR RRC (i.e., LTE RRC cannot configure FR1 gap).

Further, in NR-DC, the gapFR1 can only be set up in the measConfig associated with the MCG. The gapFR1 cannot be configured together with gapUE unless concurrent MGs are supported. The applicability of the FR1 measurement gap is according to TS 38.133. Furthermore, in gapFR1ToAddModList, a list of FR1 measurement gap configuration is added or modified. The network configures this field only in NR standalone. In gapFR1ToReleaseList, a list of FR1 measurement gap configuration is released. The gapFR2 corresponds to a measurement gap configuration that applies to FR2 only. In (NG)EN-DC or NE-DC, the gapFR2 can only be set up by NR RRC (i.e., LTE RRC cannot configure FR2 gap). In NR-DC, the gapFR2 can only be set up in the measConfig associated with MCG. Further, the gapFR2 cannot be configured together with gapUE unless concurrent MGs are supported. The applicability of the FR2 measurement gap is according to TS 38.133. In gapFR2ToAddModList, a list of FR2 measurement gap configuration is added or modified. The network configures this field only in NR standalone.

Furthermore, in gapFR2ToReleaseList of Table 1, a list of FR2 measurement gap configuration is to be released. The gapPriority indicates the priority of this measurement gap (see TS 38.133). Value 1 indicates highest priority, value 2 indicates second level priority, and the like. The gapSharing indicates the measurement gap sharing scheme that applies to this GapConfig. For applicability of the different gap sharing schemes, see TS 38.133. Value scheme00 corresponds to scheme "00," value scheme01 corresponds to scheme "01," and the like. The network does not include this field if the GapConfig is configured by gapFR1, gapFR2, or gapUE.

Further, the gapUE indicates measurement gap configuration that applies to all frequencies (FR1 and FR2). In (NG)EN-DC, the gapUE cannot be set up by NR RRC (i.e., only LTE RRC can configure per UE measurement gap). In NE-DC, the gapUE can only be set up by NR RRC (i.e., LTE RRC cannot configure per UE gap). Further, in NR-DC, the gapUE can only be set up in the measConfig associated with MCG. The per UE measurement gap is configured with other FR1 gap and/or FR2 gap simultaneously only while the per UE gap is associated with PRS measurement. The applicability of the per UE measurement gap is according to TS 38.133.

In gapUEToAddModList of Table 1, a list of per UE measurement gap configuration is added or modified. The per UE measurement gap can be configured with other FR1 gap, FR2 gap, or a combination thereof simultaneously only while this per UE gap is associated with PRS measurement. The network configures this field only in NR standalone. Further, in gapUEToReleaseList, a list of per UE measurement gap configuration is required to be released. A value gapOffset is the gap offset of the gap pattern with MGRP indicated in the field MGRP. The value range is from 0 to MGRP−1. If nscgInd-r17 is present, the gapOffset value refers to the starting point of a visible interruption length−1 (VIL1) before a measurement length (ML). Further, measGapId is an ID of the measurement gap configuration. A value mgl is the measurement gap length in ms of the measurement gap. If nscgInd-r17 is not present, the measurement gap length is according to TS 38.133. If nscgInd-r17 is present, this field indicates the ML in NCSG pattern and is configured according to Table 9.1.2C-1 in TS 38.133. Value msldot5 corresponds to 1.5 ms, ms3 corresponds to 3 ms, and the like. If mgl-r16 or mgl-r17 is present, the UE may ignore the mgl (without suffix).

Further, MGRP is a measurement gap repetition period (MGRP) in ms of the measurement gap. The MGRP is according to TS 38.133. A value MGTA is measurement Gap timing advance (MGTA) in ms. The applicability of the measurement gap timing advance is according to TS 38.133. Value ms0 corresponds to 0 ms, ms0dot25 corresponds to 0.25 ms and ms0dot5 corresponds to 0.5 ms. For FR2, the network only configures 0 ms and 0.25 ms. If mgta-r17 is present, the UE may ignore the MGTA (without suffix). Furthermore, nscgInd indicates that the measurement gap is a NCSG as specified in TS 38.133. Further, preConfigInd indicates whether the measurement gap is a pre-configured measurement gap. RefFR2ServCellAsyncCA indicates the FR2 serving cell identifier whose system frame number (SFN) and subframe is used for FR2 gap calculation for this gap pattern with asynchronous CA involving FR2 carrier(s). Furthermore, refServCellIndicator indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG.

Furthermore, dual connectivity or multi-radio dual connectivity is specified by 3GPP in specifications, such as TS 37.340. NG-RAN supports multi-radio dual connectivity (MR-DC) operation whereby the UE in RRC_CONNECTED is configured to utilize radio resources provided by two distinct schedulers, located in two different NG-RAN nodes connected via a non-ideal backhaul. A first NG-RAN node provides NR access, and a second NG-RAN node provides either evolved UMTS terrestrial radio access (E-UTRA) or NR access. Further, the first NG-RAN node acts as the master node (MN) and the second NG-RAN node acts as the secondary node (SN). The MN and SN are connected via a network interface and at least the MN is connected to the core network. The NG-RAN supports NG-RAN E-UTRA-NR dual connectivity (NGEN-DC), in which the UE is connected to one ng-eNB (a E-UTRA base station that can connect to 5G core) that acts as the MN and one gNB (5G base station) that acts as the SN. The NG-RAN also supports NR-E-UTRA dual connectivity (NE-DC), in which a UE is connected to one gNB that acts as the MN and one ng-eNB that acts as the SN.

Further, 3GPP introduced UL gaps for self-calibration and monitoring, specifically for FR2 frequencies. 3GPP supports FR2UL gaps for dual connectivity scenarios including EN-DC, NE-DC and NR-DC. For DC, the gaps may be allocated by the node supporting FR2, i.e., MN in NE-DC, SN in EN-DC, and either the MN or the SN in NR-DC. Measurement gaps, such as MUSIM gaps are configured by MN. Thus, when there is a collision between MUSIM gaps and FR2 UL gaps, there is a requirement to coordinate between the MN and the SN for gap sharing configuration and gap priority configuration if SN is allocating FR2UL gaps. Conventional mechanisms fail to provide the coordination between the MN and the SN upon occurrence of a collision between the MUSIM gaps and the FR2 UL gaps. Furthermore, the conventional mechanisms fail to use the measurement gaps for performing frequency measurements in case a mobile originated (MO) is not associated to a gap identifier and the MO requires a measurement gap.

Therefore, there is a need for a mechanism to overcome the above-identified problems.

FIG. 1 illustrates a gNodeB (gNB) 100 for generating frequency configurations for multiple measurement gaps according to an embodiment of the present disclosure. In an embodiment of the present disclosure, the gNB 100 is a node in a cellular network that provides connectivity between a UE and an evolved packet core (EPC). In another embodiment of the present disclosure, the gNB 100 is a 3GPP 5G next generation base station which supports a 5G NR.

In another embodiment of the present disclosure, the gNB 100 is a network node which supports the configuration of protocols similar to Radio Resource Control used to configure the UE in any wireless technology, such as 6G, 7G, and the like. Hereinafter, it is understood that terms including "unit" or "module" throughout the specification may refer to the unit for processing at least one function or operation of the gNB and may be implemented in hardware, software, or a combination of hardware and software.

Referring to FIG. 1, the gNB 100 may include one or more processors 102, a communication unit 104 (e.g., communicator or communication interface), and a memory unit or memory 106 (e.g., storage). The communication unit 104 may perform functions for transmitting and receiving signals via a wireless channel.

As an example, the one or more processors 102 may be a single processing unit or a number of units, all of which could include multiple computing units. The one or more processors 102 may be implemented as one or more microprocessors, microcomputers, microcontrollers, digital signal processors, central processing units, state machines, logic circuitries, and/or any devices that manipulate signals based on operational instructions. Among other capabilities, the one or more processors 102 are configured to fetch and execute computer-readable instructions and data stored in the memory unit 106. The one or more processors 102 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors may control the processing of the input data in accordance with a predefined operating rule or artificial intelligence (AI) model stored in the non-volatile memory and the volatile memory, i.e., memory unit 106. The predefined operating rule or artificial intelligence model is provided through training or learning.

The memory unit 106 may include any non-transitory computer-readable medium known in the art including, for example, volatile memory, such as static Random-Access memory (SRAM) and dynamic random access memory (DRAM), and/or non-volatile memory, such as read-only memory (ROM), erasable programmable ROM, flash memories, hard disks, optical disks, and magnetic tapes.

Some example embodiments disclosed herein may be implemented using processing circuitry. For example, some example embodiments disclosed herein may be implemented using at least one software program running on at least one hardware device and performing network management functions to control the elements.

In an embodiment of the present disclosure, while configuring the UE with a per-UE or a per-frequency range (FR) measurement gap, the one or more processors 102 of the gNB 100 configures a first measurement gap without using a gap identifier in a first frequency configuration associated with one or more first frequency layers via one or more modes. The gap identifier is used to identify a measurement gap, such that the measurement gap may be used to perform the one or more frequency measurements. In an exemplary embodiment of the present disclosure, the one or more modes include a radio resource control (RRC) message, an RRC reconfiguration or an RRC resume including gapFR1, gapFR2, or a gapUE as a setup. Further, the one or more processors 102 determine that a second measurement gap is required based on an addition of one or more second frequency layers. The addition of the one or more second frequency layers may include an addition of a measurement object. The Measurement object specifies what is required to be measured.

In an exemplary embodiment of the present disclosure, the measurement object may include the configuration for the frequency, reference signals, and the like. In an embodiment of the present disclosure, the second measurement gap maybe a different per-UE gap or same type of per-FR gap. The one or more processors 102 add the second measurement gap to a measurement gap list of a UE upon determining that the second measurement gap is required. In an embodiment of the present disclosure, the measurement gap list includes a list of measurement gaps for performing one or more frequency measurements. For example, inter-frequency, inter-radio access technology (RAT) measurements, intra-frequency measurements outside an active downlink bandwidth part (BWP), or any combination thereof. In an exemplary embodiment of the present disclosure, the first measurement gap corresponds to a first per-UE measurement gap or a first per-frequency range (FR) measurement gap.

In an exemplary embodiment of the present disclosure, the second measurement gap corresponds to a second per-UE measurement gap or a second per-FR measurement gap. For example, the gNB 100 adds the second measurement gap using gapUEToAddModList or gapFR1ToAddModListor gapFR2ToAddModList including the gap identifier for the second measurement gap. However, the gNB 100 does not release the first measurement gap. The second measurement gap may be configured with a gap identifier, but the first measurement gap may not be released and may not include the gap identifier.

In an embodiment of the present disclosure, the gap identifier corresponds to an identifier as measurement gap configuration. All the measurement gaps except either one perUE or one or both of perFR1 and perFR2 are required to have a gap identifier. A measurement gap configured without the gap identifier may be associated with all the measurement objects/reference signals which requires the measurement gaps and are not associated with a measurement gap through a gap identifier.

Further, the one or more processors 102 configures the second measurement gap by using the gap identifier in a second frequency configuration upon adding the second measurement gap to the measurement gap list. In configuring the second measurement gap by using the gap identifier, the one or more processors 102 transmit the gap identifier for the second measurement gap in an RRC message. In an embodiment of the present disclosure, the gNB 100 includes a mapping of the one or more second frequency layers to the second measurement gap through gapUEToAddModList, gapFR1ToAddModList or gapFR2ToAddModList by providing the gap identifier for the associated one or more second frequency layers in one or more RRC messages.

Furthermore, the one or more processors 102 transmit the first frequency configuration and the second frequency configuration to the UE for performing the one or more frequency measurements.

In another embodiment of the present disclosure, the one or more processors 102 remove the first measurement gap from the measurement gap list of the UE by sending a release message to the UE upon determining that the second measurement gap is required for the one or more second frequency layers. In an embodiment of the present disclosure, a gapFR1, gapFR2, or gapUE is set as release in the release message.

Further, the one or more processors 102 add an additional measurement gap to the measurement gap list of the UE upon removing the first measurement gap. In an embodiment of the present disclosure, the additional measurement gap is similar to the first measurement gap. The one or more processors 102 add the second measurement gap to the measurement gap list of the UE upon adding the additional measurement gap. For example, the gNB 100 adds both the additional measurement gap and the second measurement gap by using gapUEToAddModList, gapFR1ToAddModList, gapFR2ToAddModList including gap identifier for each of the additional measurement gap and the second measurement gap.

Furthermore, the one or more processors 102 associate a first gap identifier with the additional measurement gap upon adding the second measurement gap to the measurement gap list. The one or more processors 102 map the one or more first frequency layers with the additional measurement gap by adding the first gap identifier for each of the one or more first frequency layers in the first frequency configuration/the RRC messages. The one or more processors 102 associate a second gap identifier with the second measurement gap.

Further, the one or more processors 102 map the one or more second frequency layers with the second measurement gap by adding the second gap identifier for each of the one or more second frequency layers in the second frequency configuration/the RRC messages. The one or more processors 102 transmit the first frequency configuration and the second frequency configuration to the UE for applying the additional measurement gap and the second measurement gap. In an embodiment of the present disclosure, while measuring a frequency layer which requires measurement gaps, the UE uses the measurement gap mapped to a corresponding frequency layer.

For example, the gNB 100 has an option to configure the measurement gaps using gapToAddModList structure. However, in the case of a handover from the gNB 100 which does not support concurrent gaps where a measurement gap is configured to a gap which supports concurrent gaps, the gNB 100 may either release the gaps configured with gapUE/gapFR1/gapFR2 and add multiple gaps using gapToAddModList structure or configure gaps through implicit gaps.

Figure 2:
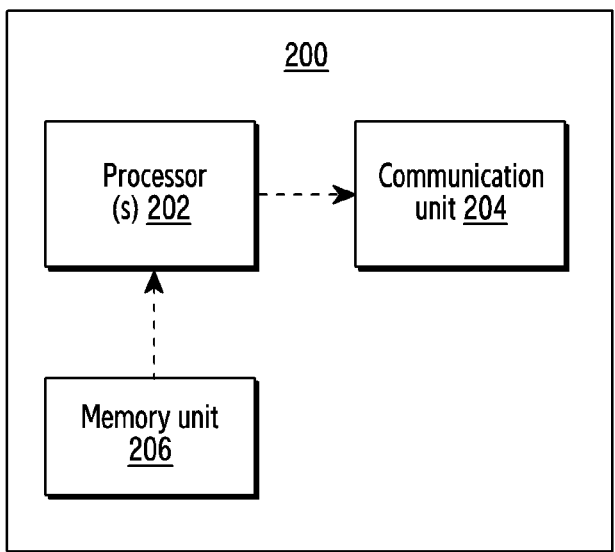
FIG. 2 illustrates a UE for managing gap configuration of multiple measurement gaps according to an embodiment of the present disclosure.

FIG. 2 illustrates the UE 200 for managing gap configuration of multiple measurement gaps according to an embodiment of the present disclosure. Hereinafter, it is understood that terms including "unit" or "module" at the end may refer to the unit for processing at least one function or operation and may be implemented in hardware, software, or a combination of hardware and software.

Referring to FIG. 2, the UE 200 may include one or more processors 202, a communication unit 204 (e.g., communicator or communication interface), and a memory unit or memory 206 (e.g., storage). By way of example, the UE 200 may be an equipment, such as a cellular phone or other devices that communicate over a plurality of cellular networks (such as a 3G, 4G, a 5G or pre-5G, 6G network or any future wireless communication network). The communication unit 204 may perform functions for transmitting and receiving signals via a wireless channel. In an embodiment of the present disclosure, the communication unit 104 associated with the gNB 100 and the communication unit 204 associated with the UE 200 facilitate communication between the gNB 100 and the UE 200.

As an example, the one or more processors 202 may be a single processing unit or a number of units, all of which could include multiple computing units. The one or more processors 202 may be implemented as one or more microprocessors, microcomputers, microcontrollers, digital signal processors, central processing units, state machines, logic circuitries, and/or any devices that manipulate signals based on operational instructions. Among other capabilities, the one or more processors 202 are configured to fetch and execute computer-readable instructions and data stored in the memory unit 206. The one or more processors 202 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors may control the processing of the input data in accordance with a predefined operating rule or artificial intelligence (AI) model stored in the non-volatile memory and the volatile memory, i.e., memory unit 206. The predefined operating rule or artificial intelligence model is provided through training or learning.

The memory unit 206 may include any non-transitory computer-readable medium known in the art including, for example, volatile memory, such as static Random-Access memory (SRAM) and dynamic random access memory (DRAM), and/or non-volatile memory, such as read-only memory (ROM), erasable programmable ROM, flash memories, hard disks, optical disks, and magnetic tapes.

Some example embodiments disclosed herein may be implemented using processing circuitry. For example, some example embodiments disclosed herein may be implemented using at least one software program running on at least one hardware device and performing network management functions to control the elements.

In an embodiment of the present disclosure, the one or more processors 202 of the UE 200 receive the first frequency configuration associated with the one or more first frequency layers and the second frequency configuration associated with the one or more second frequency layers from the gNB 100. The first frequency configuration includes information associated with the one or more first frequency layers and the second frequency configuration includes information associated with the one or more second frequency layers, such as type of frequency layers, value of frequency layers, and the like. In an embodiment, the frequency configuration may be received in RRC messages, such as RRC Reconfiguration or RRC Resume. Further, the frequency configuration may be included in RRC information elements (IE), such as MeasObjectNR or MeasObjectEUTRA. In an embodiment, the frequency configuration may be included in multiple RRC IEs for some of the frequency layers, such as Positioning Reference Signals (PRS) and a part of the frequency configuration, such as the associated measurement gap may be included in measurement gap configuration. In such cases, the frequency configuration is a combination of all such configurations.

The one or more processors receive a first measurement gap configuration associated with a first measurement gap and a second measurement gap configuration associated with a second measurement gap from the gNB 100. In an embodiment of the present disclosure, the first measurement gap configuration includes one or more characteristics associated with the first measurement gap and the second measurement gap configuration includes one or more characteristics associated with the second measurement gap, such as start of the gap in time domain, length, repetition associated with measurement gaps, and the like.

Further, the one or more processors determine that the one or more first frequency layers, the one or more second frequency layers or a combination thereof are required to perform the one or more frequency measurements when the first frequency configuration and the second frequency configuration are received by the UE. In an exemplary embodiment of the present disclosure, the one or more frequency measurements include inter-frequency, inter-radio access technology (RAT) measurements, intra-frequency measurements outside the active BWP and positioning reference signal measurements, or any combination thereof. In an embodiment of the present disclosure, the intra-frequency measurements are performed using a measurement gap if synchronization signal block (SSB) is not completely contained in an active Downlink Bandwidth Part (DL BWP).

Furthermore, the one or more processors determine if the gap identifier is associated with the one or more first frequency layers or the one or more second frequency layers from the received first frequency configuration, the received second frequency configuration, the first measurement gap configuration, and the second measurement gap configuration. The one or more processors performs such determination upon determining that the at least one of the one or more first frequency layers and the one or more second frequency layers are required to perform the one or more frequency measurements. In determining if the gap identifier is associated with one of the one or more first frequency layers and the one or more second frequency layers, the one or more processors determine that the gap identifier is unavailable for the first measurement gap based on the received first measurement gap configuration and for the one or more first frequency layers based on the received first frequency configuration. Further, the one or more processors determine that the gap identifier is available for the second measurement gap based on the received second measurement gap configuration and for the one or more second frequency layers based on the received second frequency configuration.

The one or more processors then associate the first measurement gap with the one or more first frequency layers and the second measurement gap with the one or more second frequency layers based on a result of the determination. In associating the first measurement gap with the one or more first frequency layers and the second measurement gap with the one or more second frequency layers, the one or more processors associate the first measurement gap with the one or more first frequency layers upon determining that the gap identifier is unavailable for the first measurement gap and the one or more first frequency layers. Further, the one or more processors associate the second measurement gap with the one or more second frequency layers upon determining that the gap identifier is available for the second measurement gap and the one or more second frequency layers.

Further, the one or more processors perform the one or more frequency measurements of the one or more first frequency layers and the one or more second frequency layers by applying the first measurement gap, the second measurement gap, or a combination thereof based upon completing the association. In performing the one or more frequency measurements of the one or more first frequency layers and the one or more second frequency layers, the one or more processors perform the one or more frequency measurements of the one or more first frequency layers by applying the first measurement gap upon completion of associating the first measurement gap with the one or more first frequency layers. Furthermore, the one or more processors perform the one or more frequency measurements of the one or more second frequency layers by applying the second measurement gap based on a result of associating the second measurement gap with the one or more second frequency layers.

For example, while measuring a frequency layer which requires measurement gaps, if the gap identifier is provided in a frequency configuration for the frequency layer, the UE 200 uses a newly added measurement gap with the gap identifier i.e., the second measurement gap. If there is no gap identifier provided in the frequency configuration for the frequency layer, the UE 200 uses the gap which is configured without the gap identifier i.e., the first measurement gap. The process to perform the gap configuration for multiple measurement gaps by using a single gap identifier has been elaborated in further paragraphs of the disclosure in reference to FIG. 4.

In an exemplary scenario, the UE 200 initially is configured to measure two frequency layers F1 and F2 and the gNB 100 has configured a per-UE measurement gap (for e.g., gap 1). Later, the UE 200 is configured to measure another frequency layer F3 and the gNB 100 decides to configure a second per-UE measurement gap for measuring F3. The gNB 100 does not release the measurement gap gap1, but adds the new measurement gap (for e.g., gap2) using gapUEToAddModList. Further, the gNB 100 allocates the gap identifier only for gap2. The gNB 100 further includes the gap identifier of gap2 in the configuration of F3. While measuring F3, the UE 200 uses gap2 and while measuring F1 and F2, the UE 200 uses the gap which is not configured with any gap identifier, i.e., gap1. In an embodiment of the present disclosure, the gNB 100 may add the gaps using gapFR1/gapFR2/gapUE, as setup without gap-ids, anytime irrespective of whether there are gaps already configured with gapUEToAddModList, gapFR1ToAddModList or gapFR2ToAddModList. However, the gNB 100 may ensure that only one gap UE or one each of gapFR1/gapFR2 are configured at any time.

Further, the gap identifier is optionally present when the one or more measurement gaps are configured as pre-configured measurement gaps. Otherwise, the measurement gap is not present and when absent the field is required to be released by the UE.

In an embodiment of the present disclosure, in accordance with LTE specification and release 15 and release 16 (R16) of NR specification, the gNB 100 may configure the UE 200 either with one per-UE measurement gap (configured using RRC IE gapUE) or one each per-FR measurement gaps (configured using RRC IE gapFR1 or gapFR2). These measurement gaps are configured without using the gap identifier as gapUE/gapFR1/gapFR2 does not have a gap identifier. In R16, the UE 200 uses the gap configured using gapUE for all the measurements. Similarly, the UE 200 uses the gap configured using gapFR1 for all the measurement in FR1 and the UE 200 uses the gap configured using gapFR2 for all the measurements in FR2. However, in NR R17, 3GPP introduced concurrent gaps. The UE 200 may be configured with multiple gaps using a gapToAddModList. Any gap configured using gapToAddModList may have a gap identifier. Each measurement object may be associated explicitly by including gap identifier in a mobile originated (MO) configuration.

In an embodiment, implicit gap aspect of the present disclosure provides that gapUE/gapFR1/gapFR2 (configured without gap identifiers) and the gapToAddModList (configured with gap identifiers) can be configured together. Further, a different UE and gNB 100 behaviour is disclosed for handling the measurement gaps configured without the gap identifier. When the gapToAddModList are not configured, the measurement gaps configured with gapUE/gapFR1/gapFR2 are applicable for all the frequencies (as in legacy). When the gapToAddModList is configured, the measurement gaps configured with gapUE/gapFR1/gapFR2 are applicable for the frequencies for which an associated gap id is not provided in the MO configuration.

In another embodiment of the present disclosure, the one or more processors manage gap configuration of the multiple measurement gaps. The one or more processors receive the first frequency configuration associated with the one or more first frequency layers and the second frequency configuration associated with the one or more second frequency layers from the gNB 100 upon removal of the first measurement gap associated with the one or more frequency layers from the measurement gap list of the UE 200.

Further, the one or more processors determine that the one or more first frequency layers, the one or more second frequency layers, or a combination thereof are required to perform the one or more frequency measurements upon receiving the first frequency configuration and the second frequency configuration. The one or more processors determine that the first gap identifier is associated with the additional measurement gap and the one or more first frequency layers based on the received first frequency configuration. Further, the one or more processors determine that the second gap identifier is associated with the second measurement gap and the one or more second frequency layers based on the received first frequency configuration.

Furthermore, the one or more processors associate the additional measurement gap with the one or more first frequency layers upon determining that the first gap identifier is associated with the additional measurement gap and the one or more first frequency layers. The one or more processors associate the second measurement gap with the one or more second frequency layers upon determining that the second gap identifier is associated with the second measurement gap and the one or more second frequency layers.

Further, the one or more processors perform the one or more frequency measurements of the one or more first frequency layers by applying the additional measurement gap based on a result of associating the additional measurement gap with the one or more first frequency layers. The one or more processors perform the one or more frequency measurements of the one or more second frequency layers by applying the second measurement gap based on a result of associating the second measurement gap with the one or more second frequency layers. The process to perform the gap configuration for multiple measurement gaps by using two gap identifiers has been elaborated in further paragraphs of the disclosure in reference to FIG. 3.

For example, the UE 200 is initially configured to measure two frequency layers F1 and F2 and the gNB 100 has configured a per-UE measurement gap (for e.g., gap1). Later, the UE 200 is configured to measure another frequency layer F3 and the gNB 100 decides to configure a second per-UE measurement gap for measuring F3. The gNB 100 releases the gap 1 by using RRC IEs gapUE set as release and then adds two measurement gaps (gap1 and gap2) using gapUEToAddModList. Further, the gNB 100 allocates a gap-id for both gap 1 and gap2. Furthermore, the gNB 100 includes gap-id of gap1 in the configuration of F1 and F2, and the gap-id of gap2 in the configuration of F3.

In yet another embodiment of the present disclosure, the one or more processors receive a gap priority associated with each of a plurality of connected mode gaps and one or more measurement gaps from the gNB 100. In an exemplary embodiment of the present disclosure, the plurality of connected mode gaps include one or more Non-Terrestrial Network (NTN) gaps, one or more Enhanced Positioning (ePOS) gaps, one or more multi universal subscriber identity module (MUSIM) gaps, one or more frequency range 2 uplink (FR2UL) gaps, or any combination thereof. In an exemplary embodiment, the plurality of connected mode gaps are the gaps that are not measurement gaps. The properties and purpose of the plurality of connected mode gaps are different from the measurement gaps. For example, the MUSIM gaps are provided for supporting a different universal subscriber identity module (USIM) within the same device and the FR2UL gaps may be provided for body proximity sensing and both of them are connected mode gaps which are not used for measurements for the network providing them.

In an embodiment of the present disclosure, the gap priority is per MUSIM gap for individual MUSIM gap. In another embodiment of the present disclosure, a single gap priority may be provided for a particular type of gap. For example, a single gap priority for all the MUSIM gaps, a single gap priority for all the NTN gaps or a single gap priority for all the ePOS gaps. In an embodiment of the present disclosure, a priority level of the MUSIM gaps may be configured, such that the priority level may be comparable to priority of other measurement gaps. The UE 200 applies the gap priority among the one or more measurement gaps, the one or more NTN gaps, the one or more ePOS gaps and the one or more MUSIM gaps. Further, the UE 200 also applies the gap priority between the one or more MUSIM gaps and the one or more FR2UL gaps.

Further, the one or more processors determine an occurrence of a gap collision between two or more connected mode gaps of the plurality of connected mode gaps, the one or more measurement gaps, or a combination thereof upon receiving the gap priority. In determining the occurrence of the gap collision, the one or more processors determine if a start time and a gap length of two or more connected mode gaps overlap each other or the start time and the gap length of one or more connected mode gaps and the one or more measurement gaps overlap each other. For example, if the start time of a MUSIM gap is SFN 10 and subframe 0, start time of a NTN gap is SFN 14 and sub frame 2, the length of the MUSIM gap is 5 frames and the length of the NTN gap is 2 frames, the gaps overlap as the MUSIM gap occur between SFN 10 subframe 0 till SFN 15 subframe 0 while the NTN gap occurs between SFN 14 and subframe 2 to SFN 15 and subframe 2.

In other words, if the start time and gap length of the connected mode gaps overlap each other, partially or completely, the start time and the gap length of the connected mode gaps overlap. In an exemplary embodiment of the present disclosure, the two or more connected mode gaps include two or more NTN gaps, two or more ePOs gaps, two or more FR2UL gaps, two or more MUSIM gaps, or any combination thereof. In an embodiment of the present disclosure, the start time corresponds to a starting SFN and a starting subframe. Further, the one or more processors detect the gap collision between the two or more connected mode gaps upon determining that the start time and the gap length of the two or more connected mode gaps overlap each other. The one or more processors detect the gap collision between the one or more connected mode gaps and the one or more measurement gaps upon determining that the start time and the gap length of the one or more connected mode gaps and the one or more measurement gaps overlap each other.

For example, if the start time of a MUSIM gap is SFN 10 and subframe 0, start time of a measurement gap is SFN 14 and sub frame 2, the length of the MUSIM gap is 5 frames and the length of the measurement gap is 2 frames, the gaps overlap as the MUSIM gap occur between SFN 10 subframe 0 till SFN 15 subframe 0 while the measurement gap occurs between SFN 14 and subframe 2 to SFN 15 and sub frame 2. The one or more processors also determine if a start time and a gap length of MUSIM gap overlaps with a start time, a gap length, a total duration of downlink and special slots between start and end of FR2UL gap overlap each other. The one or more processors detect the gap collision between the MUSIM gap and the FR2UL gap based on a result of the determination.

Furthermore, the one or more processors detect a connected mode gap among the two or more connected mode gaps with a highest priority, a measurement gap among the one or more measurement gaps with a highest priority or a combination thereof based on the received gap priority for each of the set of plurality of connected mode gaps and the one or more measurement gaps upon determining the occurrence of the gap collision. In detecting the connected mode gap among the two or more connected mode gaps with the highest priority, the measurement gap among the one or more measurement gaps with the highest priority or a combination thereof, the one or more processors compare the gap priority associated with the one or more connected mode gaps, the one or more measurement gaps, or a combination thereof. Further, the one or more processors detect the connected mode gap, the measurement gap, or a combination thereof with the highest priority based on a result of the comparison. In an embodiment of the present disclosure, the gap priority associated with the connected mode gap corresponds to an integer. In an exemplary embodiment of the present disclosure, the highest gap priority associated with connected mode gap is equal to 1. In an exemplary embodiment of the present disclosure, a lowest gap priority associated with the connected mode gap is equal to 16.

The one or more processors 202 perform the one or more frequency measurements by applying the detected connected mode gap, the detected measurement gap, or a combination thereof. The process to perform the gap configuration for multiple measurement gaps and an application of gap priorities has been elaborated in further paragraphs of the disclosure in reference to FIG. 5. For example, in a scenario the gap priority allocated for different type of gaps are NTN gap1: prio1, NTN gap2: prio2, ePOS gap1: prio3, MUSIM periodic gap1: prio4, FR2UL gap: prio5, MUSIM aperiodic gap: prio6, Measurement gap1: prio7, and measurement gap2: prio8. Prio1 is a highest priority and prio8 is a lowest priority. Based on the priorities and the prioritization relationship, if there is a collision between the NTN gap1 and the NTN gap2, the UE 200 uses the gap for the NTN gap1. Further, if there is a collision between the NTN gap1 and the ePOS gap1, the UE 200 uses the gap for the NTN gap1. If there is a collision between the NTN gap 1, the NTN gap2, the ePOS gap, the measurement gap 1, or the measurement gap2, and the FR2UL gap, the UE 200 uses the gap for both the NTN gap1, the NTN gap2, the ePOS gap, the measurement gap 1, or the measurement gap2 and the FR2UL gap.

Further, if there is a collision between the MUSIM periodic gap and the FR2UL gap, the UE 200 uses the gap for the MUSIM periodic gap as the priority of the MUSIM periodic gap is higher. Similarly, if there is a collision between the MUSIM aperiodic gap and the FR2UL gap, the UE 200 uses the gap for the FR2UL gap as the priority of the FR2UL gap is higher.

In an embodiment of the present disclosure, the one or more processors determine if the gap priority for the one or more connected mode gaps are equal based on the received gap priority upon determining the occurrence of the gap collision. In an embodiment of the present disclosure, if there are more than one connected mode gaps configured with a same gap priority, the gNB 100 configures the UE 200 with a gap sharing configuration indicating how the one or more connected mode gaps can be shared between different colliding gaps with equal gap priority. Further, the one or more processors receive the gap sharing configuration from the gNB 100 upon determining that the gap priority for the one or more connected mode gaps, the one or more measurement gaps, or a combination thereof are equal.

In an embodiment of the present disclosure, the gap sharing configuration may be configured by the gNB 100 along with the gap priority. In an embodiment of the present disclosure, the gap sharing configuration includes a gap sharing scheme or gap sharing ratio associated with each of the one or more connected mode gaps and the one or more measurement gaps for sharing the one or more connected mode gaps and the one or more measurement gaps across intra-frequency, inter-frequency and inter-RAT measurements. In an embodiment of the present disclosure, the gap sharing ratio can be associated with various gaps, such as measurement gaps including the gaps for positioning, NTN gaps, ePOS gaps, MUSIM gaps.

In another embodiment of the present disclosure, the gap sharing ratio may be associated between MUSIM gaps and FR2UL gaps. All connected mode gaps with the same gap priority may share the gaps according to the configured gap sharing configuration. Alternately, the network may indicate gap identifiers of connected mode gaps which are using the gap sharing configuration. Further, the one or more processors 202 perform the one or more frequency measurements by applying the one or more connected mode gaps based on the received gap sharing configuration. The process to perform the gap configuration for multiple measurement gaps and an application of the gap sharing configuration has been elaborated in further paragraphs of the disclosure in reference to FIG. 6.

Further, an exemplary specification which may be captured in TS38.331 regarding the gap sharing configuration is given in Table 2.

TABLE 2

5.5.2.11 Measurement gap sharing configuration
The UE shall:
1>                          if intergap-gapSharingFR1 is set to setup:
2>                          if an FR1 intergap-gap sharing configuration is already setup:
3>                          release the FR1 intergap-gap sharing configuration;
2>                          if intergap-gap sharingConfig includes gappriority,
3>setup the FR1 intergap-gap gap sharing configuration indicated by the intergap-gap sharingConfig among the gaps with gappriority in accordance with the received intergap-gapSharingFR1;
2> else if intergap-gap sharingConfig includes gap-idlist
3> setup the FR1 intergap-gap gap sharing configuration indicated by the intergap-gap sharingConfig among the gaps with gap-ids in the gap-idlist in accordance with the received intergap-gapSharingFR1;
1>if intergap-gapSharingFR2 is set to setup:
2>                          if an FR2 intergap-gap sharing configuration is already setup:
3>                          release the FR2 intergap-gap sharing configuration;
2>                          if intergap-gap sharingConfig includes gappriority,
3>setup the FR2 intergap-gap gap sharing configuration indicated by the intergap-gap sharingConfig among the gaps with gappriority in accordance with the received intergap-gapSharingFR2;
2> else if intergap-gap sharingConfig includes gap-idlist
3> setup the FR2 intergap-gap gap sharing configuration indicated by the intergap-gap sharingConfig among the gaps with gap-ids in the gap-idlist in accordance with the received intergap-gapSharingFR2;
1>                          if intergap-gapSharingUE is set to setup:
2>                          if a per UE intergap-gap sharing configuration is already setup:
3>                          release the per UE intergap-gap sharing configuration;
2>                          if intergap-gap sharingConfig includes gappriority,
3>setup the per UE intergap-gap gap sharing configuration indicated by the intergap-gap sharingConfig among the gaps with gappriority in accordance with the received intergap-gapSharingUE;
2> else if intergap-gap sharingConfig includes gap-idlist
3> setup the per UE intergap-gap gap sharing configuration indicated by the intergap-gap sharingConfig among the gaps with gap-ids in the gap-idlist in accordance with the received intergap-gapSharingUE;
Intergap-GapSharingConfig ::= SEQUENCE {
  Intergap-gapSharingFR2     SetupRelease { InterGap-GapSharingConfig } OPTIONAL, -- Need M
  ...,
  [[
  Intergap-gapSharingFR1              SetupRelease { InterGap-GapSharingConfig } OPTIONAL, --Need
M TABLE 2-continued

```
Intergap-gapSharingUE        SetupRelease { InterGap-GapSharingConfig } OPTIONAL -- Need M
    ]]
}
InterGap-GapSharingConfig ::= SEQUENCE {
gapPriority-r17     GapPriority-r17          OPTIONAL -- Need R
measGapList-r17    SEQUENCE (SIZE (1..maxNrofGapId-r17)) OF MeasGapId-r17 Optional --NeedR
MeasGapSharingScheme::=   ENUMERATED {scheme00, scheme01, scheme10, scheme11} Optional -
NeedR
}
```

Figure 3:
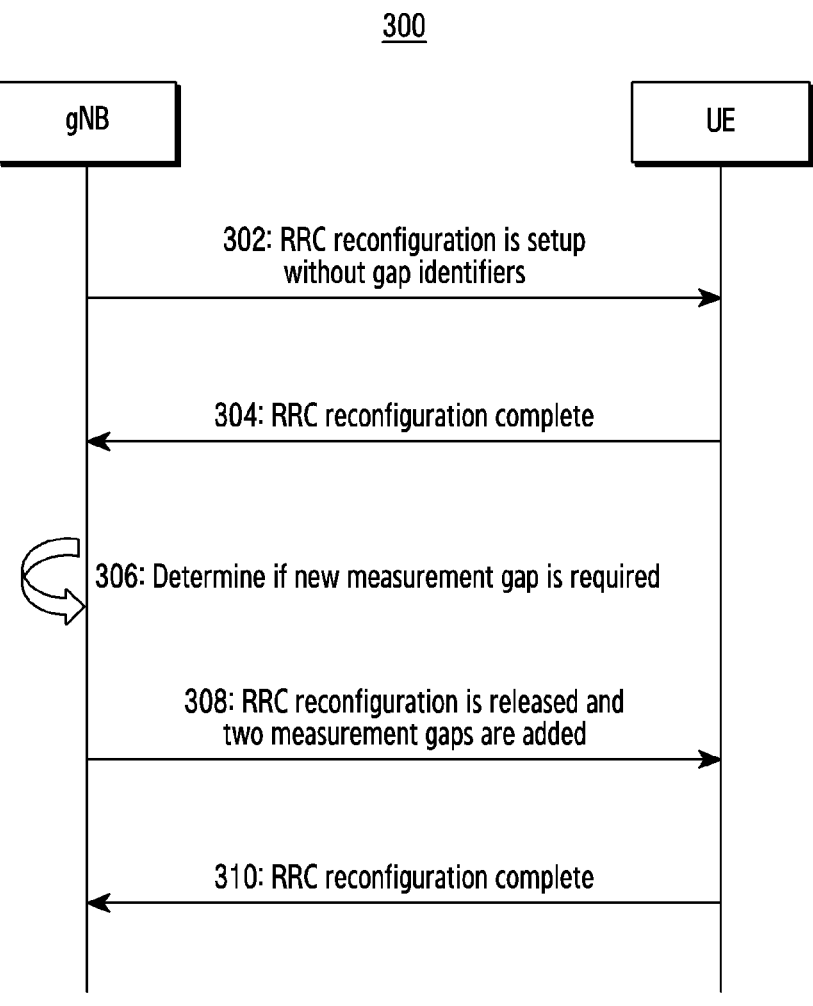
FIG. 3 illustrates a sequence diagram depicting a process to perform a gap configuration for multiple measurement gaps by using two gap identifiers according to an embodiment of the present disclosure.

FIG. 3 illustrates a sequence diagram 300 depicting a process to perform a gap configuration for multiple measurement gaps by using two gap identifiers according to an embodiment of the present disclosure. As shown in FIG. 3, at step 302, RRC reconfiguration is setup with gapUE/gapFR1/gapFR2 without using gap identifiers. At step 304, the RRC reconfiguration is completed.

Further, at step 306, it is determined that a new measurement gap configuration is required for the UE 200. At step 308, RRC reconfiguration with gapUE/gapFR1/gapFR2 is released and two measurement gaps are added via gapUE-ToAddModList, gapFR1ToAddModList, or gapFR2ToAddModList including gap identifiers. Further, all frequency layers which requires the new measurement gaps are mapped with the gap identifiers.

Furthermore, at step 310, the RRC reconfiguration is completed.

Figure 4:
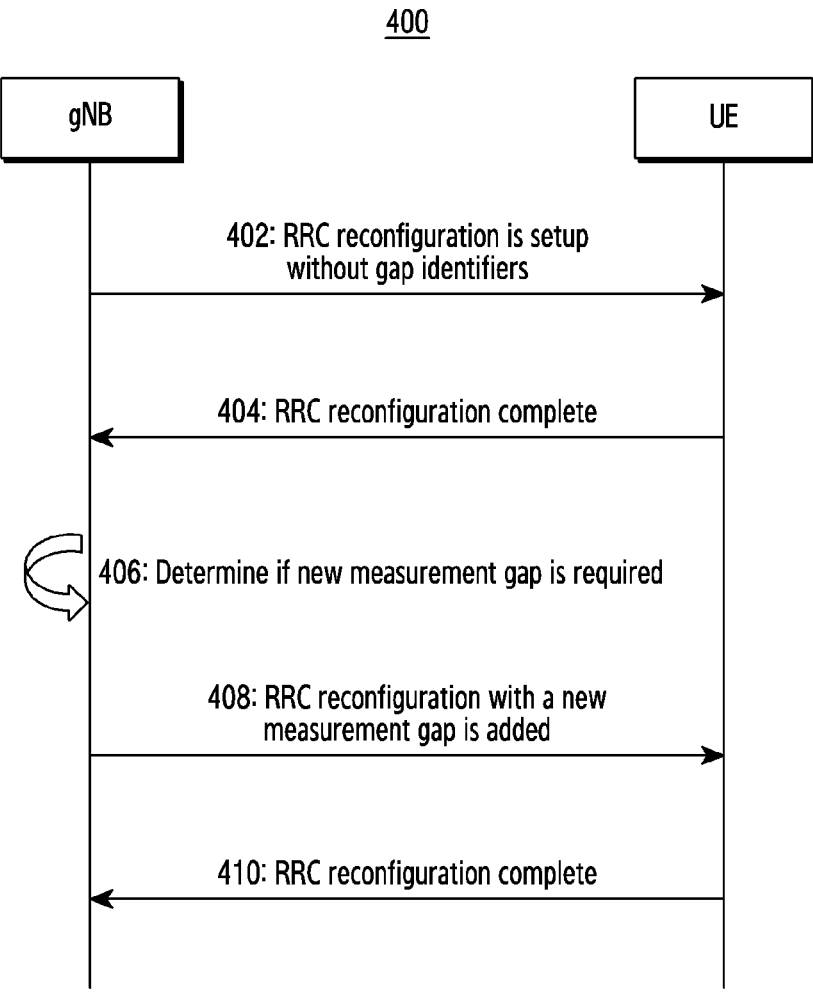
FIG. 4 illustrates a sequence diagram depicting a process to perform the gap configuration for multiple measurement gaps by using a single gap identifier according to an embodiment of the present disclosure.

FIG. 4 illustrates a sequence diagram 400 depicting a process to perform the gap configuration for multiple measurement gaps by using a single gap identifier according to an embodiment of the present disclosure.

At step 402, RRC reconfiguration is setup with gapUE/gapFR1/gapFR2 without using gap identifiers. At step 404, the RRC reconfiguration is completed.

At step 406, it is determined that a new measurement gap configuration is required for the UE 200. At step 408, RRC reconfiguration with a new measurement gap is added via gapUEToAddModList, gapFR1ToAddModList, or gapFR2ToAddModList including a single gap identifier. Further, subset of frequency layers which requires the new measurement gap are mapped with the single gap identifier. Furthermore, frequency layers not mapped to the single gap identifier may use the measurement gaps without a gap identifier.

Furthermore, at step 410, the RRC reconfiguration is completed.

Figure 5:
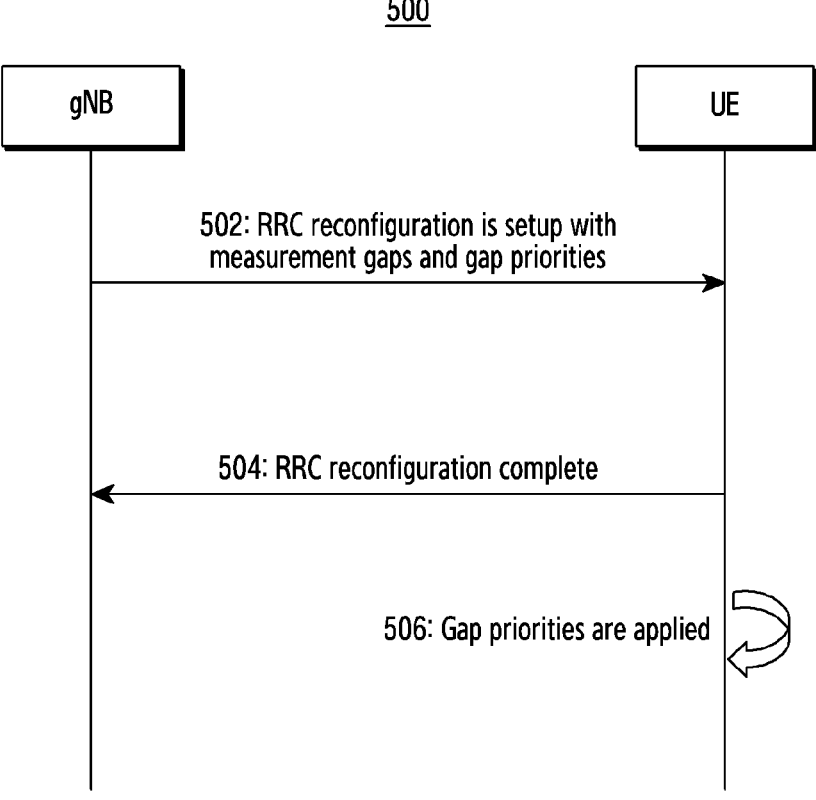
FIG. 5 illustrates a sequence diagram depicting a process to perform the gap configuration for multiple measurement gaps and an application of gap priorities according to an embodiment of the present disclosure.

FIG. 5 illustrates a sequence diagram 500 depicting a process to perform the gap configuration for multiple measurement gaps and an application of gap priorities according to an embodiment of the present disclosure.

At step 502, RRC reconfiguration is setup with measurement gaps and gap priorities for the measurement gaps, NTN gaps, ePOS gaps, MUSIM gaps and FR2UL gaps. At step 504, the RRC reconfiguration is completed. At step 506, the gap priorities are applied among the measurement gaps, the NTN gaps, the ePOS gaps, the MUSIM gaps and the FR2UL gaps. Further, the gap priorities are also applied between the MUSIM gaps and the FR2UL gaps.

Figure 6:
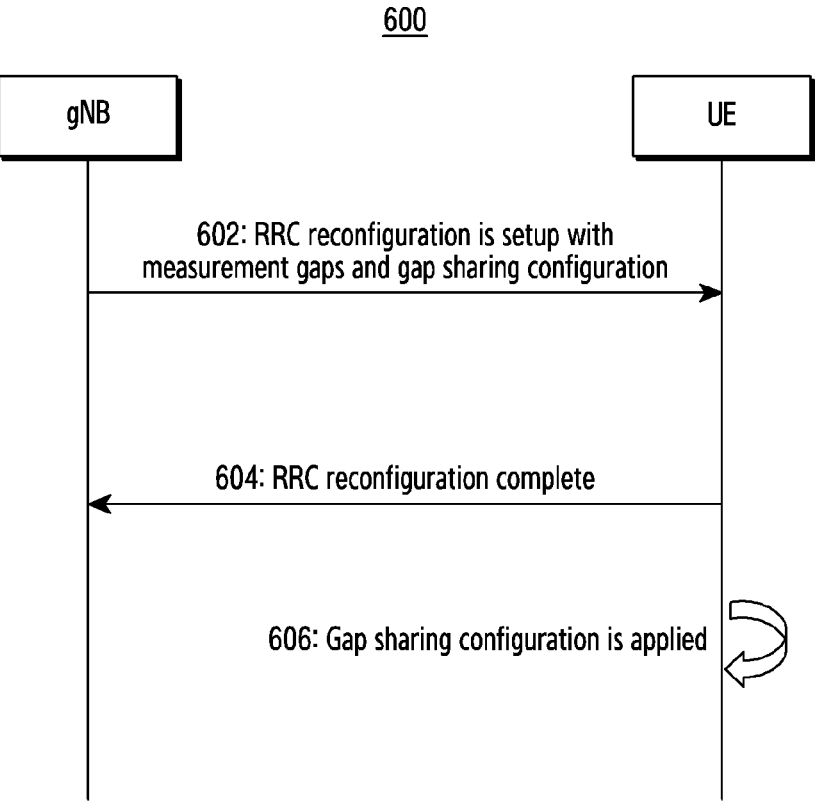
FIG. 6 illustrates a sequence diagram depicting a process to perform the gap configuration for multiple measurement gaps and an application of a gap sharing configuration according to an embodiment of the present disclosure.

FIG. 6 illustrates a sequence diagram 600 depicting a process to perform the gap configuration for multiple measurement gaps and an application of a gap sharing configuration according to an embodiment of the present disclosure.

At step 602, RRC reconfiguration is setup with measurement gaps and gap sharing configuration for the measurement gaps, NTN gaps, ePOS gaps, MUSIM gaps and FR2UL gaps. Further, at step 604, the RRC reconfiguration is completed. At step 606, the gap sharing configuration is applied among the measurement gaps, the NTN gaps, the ePOS gaps, the MUSIM gaps and the FR2UL gaps if they collide and have an equal gap priority. Further, the gap sharing configuration is also applied between the MUSIM gaps and the FR2UL gaps if they collide and have an equal gap priority.

Figure 7:
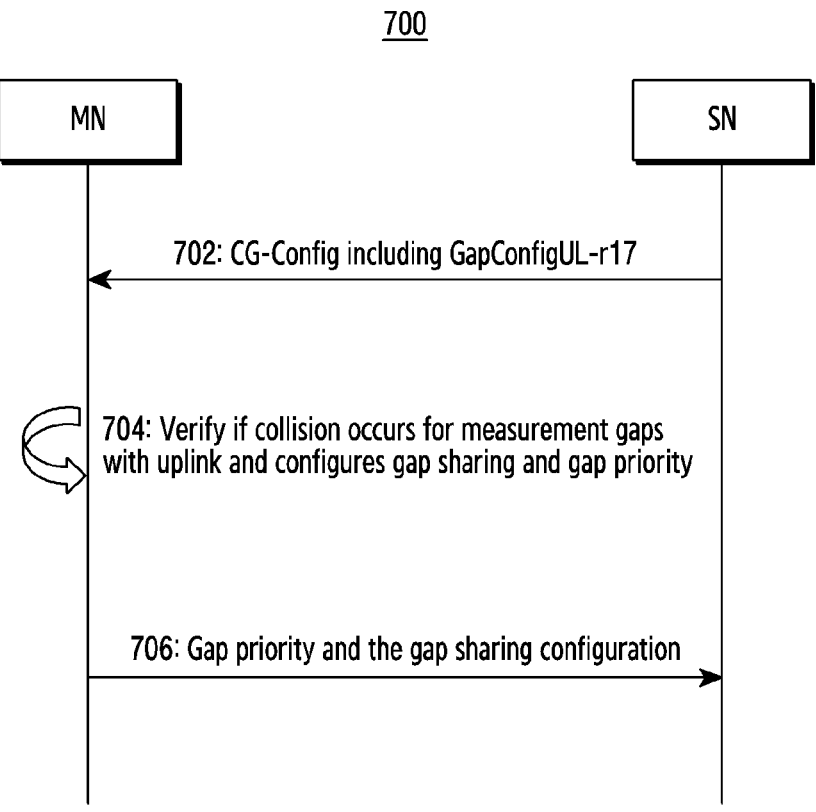
FIG. 7 illustrates a sequence diagram depicting a process of interaction between a MN and a SN for sharing information required to set gap priority and gap sharing configuration of FR2UL gaps according to an embodiment of the present disclosure.

FIG. 7 illustrates a sequence diagram 700 depicting a process of interaction between a master node (MN) and a secondary node (SN) for sharing information required to set gap priority and gap sharing configuration of FR2UL gaps according to an embodiment of the present disclosure. If the UE 200 is configured with NR-NR DC and FR2 cell group is configured on the SN, the SN may allocate the FR2UL gap. The SN informs the MN that the FR2UL gap is allocated and also informs the gap characteristics including gap length, gap offset and gap repetition period. Further, the MN verifies if there is a possible collision with any of the gaps with uplink, such as MUSIM gaps and configures gap sharing and gap priority for both FR2-UL gaps and MUSIM gaps or other gaps which involve uplink. In an embodiment of the present disclosure, the SN informs the MN through internode RRC message. An example RRC message may be CG-Config, and a sample set of changes is given below in Table 3.

TABLE 3

```
CG-Config-v1710-IEs ::= SEQUENCE {
<existing IEs>
GapConfigUL-r17 ::=              SEQUENCE {
   gapOffset-r17                 INTEGER (0..159),
   ugl-r17           ENUMERATED {ms0dot125, ms0dot25, ms0dot5, ms1},
   ugrp-r17          ENUMERATED {ms5, ms20, ms40, ms160},
   refFR2ServCellAsyncCA-r17      ServCellIndex              OPTIONAL - Cond AsyncCA
}
...
}
CG-ConfigInfo-v1710-IEs ::= SEQUENCE {
...
```

TABLE 3-continued

```
GapConfigUL-r18 ::=        SEQUENCE {
gapPriority-r18               GapPriority //Integer value representing gapPriority
gapSharingConfiguation-r18   InterGap-GapSharingConfig
}
...
}
```

At step 702, the CG-Config including GapConfigUL-r17 is sent from the SN to the MN.

At step 704, the MN verifies if there is a possible collision with any of the gaps with uplink and configures gap sharing and gap priority for both FR2-UL gaps and MUSIM gaps or other gaps which involve uplink.

At step 706, the MN shares the CG-ConfigInfo with the gap priority and the gap sharing configuration for FR2 UL gaps and other UL gaps like MUSIM gaps.

FIG. 8 illustrates a flow diagram depicting a method 800 for generating frequency configurations for multiple measurement gaps according to an embodiment of the present disclosure. The method 800 as shown in figure is implemented in a gNB 100.

At step 802, the method 800 includes configuring a first measurement gap without using a gap identifier in a first frequency configuration associated with one or more first frequency layers via one or more modes. The gap identifier is used to identify a measurement gap, such that the measurement gap may be used to perform one or more frequency measurements. In an exemplary embodiment of the present disclosure, one or more modes include an RRC message, an RRC reconfiguration or an RRC resume including gapFR1, gapFR2, or a gapUE as a setup.

At step 804, the method 800 includes determining that a second measurement gap is required based on an addition of one or more second frequency layers. The addition of the one or more second frequency layers may include an addition of a measurement object. The Measurement object specifies what is required to be measured. In an exemplary embodiment of the present disclosure, the measurement object includes the configuration for the frequency, reference signals, and the like. In an embodiment of the present disclosure, the second measurement gap maybe a different per-UE gap or same type of per-FR gap.

At step 806, the method includes adding the second measurement gap to a measurement gap list of a UE 200 upon determining that the second measurement gap is required. In an embodiment of the present disclosure, the measurement gap list includes a list of measurement gaps for performing one or more frequency measurements. For example, inter-frequency, inter-radio access technology (RAT) measurements, intra-frequency measurements outside an active downlink bandwidth part (BWP), or any combination thereof. In an exemplary embodiment of the present disclosure, the first measurement gap corresponds to a first per-UE measurement gap or a first per-frequency range (FR) measurement gap. In an exemplary embodiment of the present disclosure, the second measurement gap corresponds to a second per-UE measurement gap or a second per-FR measurement gap.

The method 800 at step 808 includes configuring the second measurement gap by using the gap identifier in a second frequency configuration upon adding the second measurement gap to the measurement gap list. In configuring the second measurement gap by using the gap identifier, the method 800 includes transmitting the gap identifier for the second measurement gap in an RRC message. In an embodiment of the present disclosure, the gNB 100 includes a mapping of the one or more second frequency layers to the second measurement gap through gapUEToAddModList, gapFR1ToAddModList or gapFR2ToAddModList by providing the gap identifier for the associated one or more second frequency layers in one or more RRC messages.

At step 810, the method 800 includes processors transmitting the first frequency configuration and the second frequency configuration to the UE 200 for performing the one or more frequency measurements.

FIG. 9 illustrates a flow diagram depicting a method 900 for managing gap configuration of multiple measurement gaps according to an embodiment of the present disclosure. The method 900 as shown in the figure is implemented in the UE 200 for managing gap configuration of multiple measurement gaps.

At step 902, the method 900 includes receiving the first frequency configuration associated with the one or more first frequency layers and the second frequency configuration associated with the one or more second frequency layers from the gNB 100. The first frequency configuration includes information associated with the one or more first frequency layers and the second frequency configuration includes information associated with the one or more second frequency layers, such as type of frequency layers, value of frequency layers, and the like.

At step 904, the method 900 includes receiving a first measurement gap configuration associated with a first measurement gap and a second measurement gap configuration associated with a second measurement gap from the gNB 100. In an embodiment of the present disclosure, the first measurement gap configuration includes one or more characteristics associated with the first measurement gap and the second measurement gap configuration includes one or more characteristics associated with the second measurement gap, such as time domain, length, repetition associated with measurement gaps, and the like.

At step 906, the method 900 includes determining that the one or more first frequency layers, the one or more second frequency layers or a combination thereof are required to perform the one or more frequency measurements upon receiving the first frequency configuration and the second frequency configuration. In an exemplary embodiment of the present disclosure, the one or more frequency measurements include inter-frequency, inter-radio access technology (RAT) measurements, intra-frequency measurements outside the active BWP and positioning reference signal measurements, or any combination thereof. In an embodiment of the present disclosure, the intra-frequency measurements are performed using a measurement gap if synchronization signal block (SSB) is not completely contained in an active downlink bandwidth part (DL BWP)

At step 908, the method 900 includes determining if the gap identifier is associated with the one or more first frequency layers or the one or more second frequency layers from the received first frequency configuration, the received second frequency configuration, the first measurement gap configuration, and the second measurement gap configuration. The one or more processors performs such determination upon determining that the at least one of the one or more first frequency layers and the one or more second frequency layers are required to perform the one or more frequency measurements. In determining if the gap identifier is associated with one of the one or more first frequency layers and the one or more second frequency layers, the method 900 includes determining that the gap identifier is unavailable for the first measurement gap based on the received first measurement gap configuration and for the one or more first frequency layers based on the received first frequency configuration. Further, the method 900 includes determining that the gap identifier is available for the second measurement gap based on the received second measurement gap configuration and for the one or more second frequency layers based on the received second frequency configuration.

At step 910, the method 900 includes associating the first measurement gap with the one or more first frequency layers and the second measurement gap with the one or more second frequency layers based on a result of the determination. In associating the first measurement gap with the one or more first frequency layers and the second measurement gap with the one or more second frequency layers, the method 900 includes associating the first measurement gap with the one or more first frequency layers upon determining that the gap identifier is unavailable for the first measurement gap and the one or more first frequency layers. Further, the method 900 includes associating the second measurement gap with the one or more second frequency layers upon determining that the gap identifier is available for the second measurement gap and the one or more second frequency layers.

At step 912, the method 900 includes performing the one or more frequency measurements of the one or more first frequency layers and the one or more second frequency layers by applying the first measurement gap, the second measurement gap, or a combination thereof based upon completing the association. In performing the one or more frequency measurements of the one or more first frequency layers and the one or more second frequency layers, the method 900 includes performing the one or more frequency measurements of the one or more first frequency layers by applying the first measurement gap based on a result of associating the first measurement gap with the one or more first frequency layers. Furthermore, the method 900 includes performing the one or more frequency measurements of the one or more second frequency layers by applying the second measurement gap based on a result of associating the second measurement gap with the one or more second frequency layers. The process to perform the gap configuration for multiple measurement gaps by using a single gap identifier has been elaborated in previous paragraphs of the disclosure in reference to FIG. 4.

FIGS. 10A and 10B illustrates a flow diagram depicting a method 1000 for generating frequency configurations for multiple measurement gaps according to another embodiment of the present disclosure. The method 1000 as shown in the figure is implemented in the gNB 100 for generating frequency configurations for multiple measurement gaps.

At step 1002, the method 1000 includes removing the first measurement gap from the measurement gap list of the UE 200 by sending a release message to the UE 200 upon determining that the second measurement gap is required for the one or more second frequency layers. In an embodiment of the present disclosure, a gapFR1, gapFR2, or gapUE is set as release in the release message.

At step 1004, the method 1000 includes adding an additional measurement gap to the measurement gap list of the UE 200 upon removing the first measurement gap. In an embodiment of the present disclosure, the additional measurement gap is similar to the first measurement gap.

At step 1006, the method 1000 includes adding the second measurement gap to the measurement gap list of the UE 200 upon adding the additional measurement gap.

At step 1008, the method 1000 includes associating a first gap identifier with the additional measurement gap upon adding the second measurement gap to the measurement gap list. In an embodiment of the present disclosure, "A" in the figure represents that the steps 1010-1016 are in continuation from step 1008.

At step 1010, the method 1000 includes mapping the one or more first frequency layers with the additional measurement gap by adding the first gap identifier for each of the one or more first frequency layers in the first frequency configuration/the RRC messages.

At step 1012, the method 1000 includes associating a second gap identifier with the second measurement gap.

At step 1014, the method 1000 includes mapping the one or more second frequency layers with the second measurement gap by adding the second gap identifier for each of the one or more second frequency layers in the second frequency configuration/the RRC messages.

At step 1016, the method 1000 includes transmitting the first frequency configuration and the second frequency configuration to the UE 200 for applying the additional measurement gap and the second measurement gap. In an embodiment of the present disclosure, while measuring a frequency layer which requires measurement gaps, the UE 200 uses the measurement gap mapped to a corresponding frequency layer. The process to perform the gap configuration for multiple measurement gaps by using two gap identifiers has been elaborated in previous paragraphs of the disclosure in reference to FIG. 3.

FIG. 11 illustrates a flow diagram depicting a method for managing gap configuration of multiple gaps according to another embodiment of the present disclosure. The method 1100 as shown in the figure is implemented in the UE 200 for generating frequency configurations for multiple measurement gaps.

At step 1102, the method 1100 includes receiving a gap priority associated with each of a plurality of connected mode gaps and one or more measurement gaps from a gNB 100. In an exemplary embodiment of the present disclosure, the plurality of connected mode gaps include one or more non-terrestrial network (NTN) gaps, one or more enhanced positioning (ePOS) gaps, one or more multi universal subscriber identity module (MUSIM) gaps, one or more frequency range 2 uplink (FR2UL) gaps, or any combination thereof. In an embodiment of the present disclosure, the gap priority is per MUSIM gap for individual MUSIM gap. In another embodiment of the present disclosure, a single gap priority may be provided for a particular type of gap. In an embodiment of the present disclosure, a priority level of the MUSIM gaps may be configured, such that the priority level may be comparable to priority of other measurement gaps.

At step 1104, the method 1100 includes determining an occurrence of a gap collision between two or more connected mode gaps of the plurality of connected mode gaps, the one or more measurement gaps, or a combination thereof upon receiving the gap priority. In determining the occurrence of the gap collision, the method 1100 includes determining if a start time and a gap length of two or more connected mode gaps overlap each other or the start time and the gap length of one or more connected mode gaps and the one or more measurement gaps overlap each other. In an exemplary embodiment of the present disclosure, the two or more connected mode gaps include two or more NTN gaps, two or more ePOs gaps, two or more FR2UL gaps, two or more MUSIM gaps, or any combination thereof. In an embodiment of the present disclosure, the start time corresponds to a starting SFN and a starting subframe.

Further, the method 1100 includes detecting the gap collision between the two or more connected mode gaps upon determining that the start time and the gap length of the two or more connected mode gaps overlap each other. The method 1100 includes detecting the gap collision between the one or more connected mode gaps and the one or more measurement gaps upon determining that the start time and the gap length of the one or more connected mode gaps and the one or more measurement gaps overlap each other. The method 1100 includes determining if a start time and a gap length of MUSIM gap overlaps with a start time, a gap length, a total duration of downlink and special slots between start and end of FR2UL gap overlap each other. The method 1100 includes detecting the gap collision between the MUSIM gap and the FR2UL gap based on a result of the determination.

At step 1106, the method 1100 includes detecting a connected mode gap among the two or more connected mode gaps with a highest priority, a measurement gap among the one or more measurement gaps with a highest priority or a combination thereof based on the received gap priority for each of the set of plurality of connected mode gaps and the one or more measurement gaps upon determining the occurrence of the gap collision. In detecting the connected mode gap among the two or more connected mode gaps with the highest priority, the measurement gap among the one or more measurement gaps with the highest priority or a combination thereof, the method 1100 includes comparing the gap priority associated with the one or more connected mode gaps, the one or more measurement gaps, or a combination thereof.

Further, the method 1100 includes detecting the connected mode gap, the measurement gap, or a combination thereof with the highest priority based on a result of the comparison. In an embodiment of the present disclosure, the gap priority associated with the connected mode gap corresponds to an integer. In an exemplary embodiment of the present disclosure, the highest gap priority associated with connected mode gap is equal to 1. In an exemplary embodiment of the present disclosure, a lowest gap priority associated with the connected mode gap is equal to 16.

At step 1108, the method 1100 includes performing the one or more frequency measurements by applying the detected connected mode gap, the detected measurement gap, or a combination thereof. The process to perform the gap configuration for multiple measurement gaps and an application of gap priorities has been elaborated in previous paragraphs of the disclosure in reference to FIG. 5.

In an embodiment of the present disclosure, the method 1100 includes determining if the gap priority for the one or more connected mode gaps are equal based on the received gap priority upon determining the occurrence of the gap collision. In an embodiment of the present disclosure, if there are more than one connected mode gaps configured with a same gap priority, the gNB 100 configures the UE 200 with a gap sharing configuration indicating how the one or more connected mode gaps can be shared between different colliding gaps with equal gap priority. Further, the method 1100 includes receiving the gap sharing configuration from the gNB 100 upon determining that the gap priority for the one or more connected mode gaps, the one or more measurement gaps, or a combination thereof are equal.

In an embodiment of the present disclosure, the gap sharing configuration may be configured by the gNB 100 along with the gap priority. In an embodiment of the present disclosure, the gap sharing configuration includes a gap sharing scheme or gap sharing ratio associated with each of the one or more connected mode gaps and the one or more measurement gaps for sharing the one or more connected mode gaps and the one or more measurement gaps across intra-frequency, inter-frequency and inter-RAT measurements. In an embodiment of the present disclosure, the gap sharing ratio can be associated with various gaps, such as measurement gaps including the gaps for positioning, NTN gaps, ePOS gaps, MUSIM gaps.

In another embodiment of the present disclosure, the gap sharing ratio may be associated between MUSIM gaps and FR2UL gaps. All connected mode gaps with the same gap priority may share the gaps according to the configured gap sharing configuration. Alternately, the network may indicate gap identifiers of connected mode gaps which are using the gap sharing configuration. Further, the method 1100 includes performing the one or more frequency measurements by applying the one or more connected mode gaps based on the received gap sharing configuration. The process to perform the gap configuration for multiple measurement gaps and an application of the gap sharing configuration has been elaborated in previous paragraphs of the disclosure in reference to FIG. 6.

The system and method disclosed herein provides multiple advantages, such as the system and method configure the concurrent measurement gaps by using implicit gap association which facilitates association of a frequency layer to a measurement gap without receiving a gap identifier from the network. Further, the system and method configure a gap priority for MUSIM gaps and inter-gap gap sharing. The system and method also allow the network to configure concurrent measurement gaps. The system and method facilitate receival of gap priority and inter-gap gap sharing for MUSIM gaps.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a base station in a wireless communication system, the method comprising:

transmitting, to a user equipment (UE), measurement gap configuration information including a first measurement gap configuration without a measurement gap identifier (ID) and a measurement gap list including at least one second measurement gap configuration with the measurement gap ID;

transmitting, to the UE, measurement object information; and configuring a measurement gap based on the first measurement gap configuration for a frequency associated with the measurement object information, in case that the measurement gap ID is not included in the measurement object information.

2. The method of claim 1, wherein the first measurement gap configuration is associated with a first gap; and wherein the first gap includes at least one of a per-UE measurement gap, a first per-frequency range (FR) measurement gap, or a second FR measurement gap.

3. The method of claim 2, wherein a positioning reference signal (PRS) measurement gap in the measurement gap configuration information is associated with the per-UE measurement gap.

4. The method of claim 1, wherein the measurement gap includes at least one of a synchronization signal block (SSB) measurement gap or a channel state information reference signal (CSI-RS) measurement gap.

5. The method of claim 1, wherein the measurement object information includes at least one of first measurement object information for an evolved universal mobile telecommunication system (UMTS) terrestrial radio access network (EUTRA) or second measurement object information for a new radio (NR).

6. A method of a user equipment (UE) in a wireless communication system, the method comprising:

receiving, from a base station, measurement gap configuration information including a first measurement gap configuration without a measurement gap identifier (ID) and a measurement gap list including at least one second measurement gap configuration with the measurement gap ID;

receiving, from the base station, measurement object information; and performing measurement over a measurement gap based on the first measurement gap configuration for a frequency associated with the measurement object information, in case that the measurement gap ID is not included in the measurement object information.

7. The method of claim 6, wherein the first measurement gap configuration is associated with a first gap; and wherein the first gap includes at least one of a per-UE measurement gap, a first per-frequency range (FR) measurement gap, or a second FR measurement gap.

8. The method of claim 7, wherein a positioning reference signal (PRS) measurement gap in the measurement gap configuration information is associated with the per-UE measurement gap.

9. The method of claim 6, wherein the measurement gap includes at least one of a synchronization signal block (SSB) measurement gap or a channel state information reference signal (CSI-RS) measurement gap.

10. The method of claim 6, wherein the measurement object information includes at least one of first measurement object information for an evolved universal mobile telecommunication system (UMTS) terrestrial radio access network (EUTRA) or second measurement object information for a new radio (NR).

11. A base station in a wireless communication system, the base station comprising:

a transceiver; and a controller operably coupled to the transceiver, the controller configured to:

transmit, to a user equipment (UE), measurement gap configuration information including a first measurement gap configuration without a measurement gap identifier (ID) and a measurement gap list including at least one second measurement gap configuration with the measurement gap ID, transmit, to the UE, measurement object information, and configure a measurement gap based on the first measurement gap configuration for a frequency associated with the measurement object information, in case that the measurement gap ID is not included in the measurement object information.

12. The base station of claim 11, wherein the first measurement gap configuration is associated with a first gap; and wherein the first gap includes at least one of a per-UE measurement gap, a first per-frequency range (FR) measurement gap or a second FR measurement gap.

13. The base station of claim 12, wherein a positioning reference signal (PRS) measurement gap in the measurement gap configuration information is associated with the per-UE measurement gap.

14. The base station of claim 11, wherein the measurement gap includes at least one of a synchronization signal block (SSB) measurement gap or a channel state information reference signal (CSI-RS) measurement gap.

15. The base station of claim 11, wherein the measurement object information includes at least one of first measurement object information for an evolved universal mobile telecommunication system (UMTS) terrestrial radio access network (EUTRA) or a second measurement object information for a new radio (NR).

16. A user equipment (UE) in a wireless communication system, the UE comprising:

a transceiver; and a controller operably coupled to the transceiver, the controller configured to:

receive, from a base station, measurement gap configuration information including a first measurement gap configuration without a measurement gap identifier (ID) and a measurement gap list including at least one second measurement gap configuration with the measurement gap ID;

receive, from the base station, measurement object information; and perform measurement over a measurement gap based on the first measurement gap configuration for a frequency associated with the measurement object information, in case that the measurement gap ID is not included in the measurement object information.

17. The UE of claim 16, wherein the first measurement gap configuration is associated with a first gap; and wherein the first gap includes at least one of a per-UE measurement gap, a first per-frequency range (FR) measurement gap, or a second FR measurement gap.

18. The UE of claim 17, wherein a positioning reference signal (PRS) measurement gap in the measurement gap configuration information is associated with the per-UE measurement gap.

19. The UE of claim 16, wherein the measurement gap includes at least one of a synchronization signal block (SSB) measurement gap or a channel state information reference signal (CSI-RS) measurement gap.

20. The UE of claim 16, wherein the measurement object information includes at least one of a first measurement object information for an evolved universal mobile telecommunication system (UMTS) terrestrial radio access network (EUTRA) or second measurement object information for a new radio (NR).

\* \* \* \* \*